(12) United States Patent
Kafle et al.

(10) Patent No.: US 9,699,500 B2
(45) Date of Patent: Jul. 4, 2017

(54) SESSION MANAGEMENT AND CONTROL PROCEDURES FOR SUPPORTING MULTIPLE GROUPS OF SINK DEVICES IN A PEER-TO-PEER WIRELESS DISPLAY SYSTEM

(71) Applicant: QUALCOMM, Incorporated, San Diego, CA (US)

(72) Inventors: Padam Lal Kafle, San Diego, CA (US); Fawad Shaukat, San Diego, CA (US); Vijay Naicker Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/106,611

(22) Filed: Dec. 13, 2013

(65) Prior Publication Data

US 2015/0172757 A1    Jun. 18, 2015

(51) Int. Cl.
*H04N 7/16*     (2011.01)
*H04N 21/4363*  (2011.01)
(Continued)

(52) U.S. Cl.
CPC ... *H04N 21/43637* (2013.01); *H04L 67/1044* (2013.01); *H04L 67/1046* (2013.01);
(Continued)

(58) Field of Classification Search
CPC ........... H04N 21/4104; H04N 21/4126; H04N 21/4355; H04N 21/4402; H04N 21/4621; H04N 21/44231; H04N 21/436
See application file for complete search history.

(56) References Cited

U.S. PATENT DOCUMENTS

| 7,035,363 B1 | 4/2006 | Ikeda |
| 2003/0114145 A1* | 6/2003 | Boda ................ H04L 29/06 |
| | | 455/412.1 |

(Continued)

FOREIGN PATENT DOCUMENTS

| EP | 2640100 A1 | 9/2013 |
| WO | WO-2013040249 A1 | 3/2013 |

OTHER PUBLICATIONS

International Search Report and Written Opinion—PCT/US2014/065455—ISA/EPO—Mar. 12, 2015.
(Continued)

*Primary Examiner* — Pankaj Kumar
*Assistant Examiner* — Timothy Newlin
(74) *Attorney, Agent, or Firm* — Knobbe, Martens, Olson & Bear

(57) ABSTRACT

An apparatus and method for session management and control procedures for supporting multiple groups of sink devices in a peer-to-peer wireless display system are described. One implementation may include an apparatus configured to transmit multimedia content to a plurality of sink devices. The apparatus may comprise a processor configured to connect to each of the sink devices with a Wi-Fi peer-to-peer connection. The processor may further be configured to receive capability information from each of the sink devices. The processor may further be configured to generate a control message including a group session ID and a transport port number. The processor may further be configured to determine a set of streaming parameters for the sink devices. The processor may further be configured to transmit, using the transport port number and according to the set of streaming parameters, the particular multimedia content to each of the Wi-Fi peer-to-peer connected sink devices.

29 Claims, 18 Drawing Sheets

(51) Int. Cl.
*H04L 29/08* (2006.01)
*H04N 7/10* (2006.01)
*H04N 21/41* (2011.01)
*H04W 8/00* (2009.01)
*H04W 76/00* (2009.01)
*H04N 21/414* (2011.01)
*H04N 21/4402* (2011.01)
*H04N 21/45* (2011.01)
*H04N 21/462* (2011.01)
*H04N 21/63* (2011.01)
*H04N 21/6405* (2011.01)

(52) U.S. Cl.
CPC ......... *H04L 67/1048* (2013.01); *H04L 67/14* (2013.01); *H04L 67/303* (2013.01); *H04N 7/106* (2013.01); *H04N 21/4126* (2013.01); *H04N 21/41407* (2013.01); *H04N 21/4402* (2013.01); *H04N 21/440263* (2013.01); *H04N 21/4516* (2013.01); *H04N 21/4621* (2013.01); *H04N 21/632* (2013.01); *H04N 21/6405* (2013.01); *H04W 8/005* (2013.01); *H04W 76/002* (2013.01)

(56) References Cited

U.S. PATENT DOCUMENTS

| | | | | |
|---|---|---|---|---|
| 2005/0025180 A1* | 2/2005 | Curcio | ............... | H04L 12/5695 370/468 |
| 2006/0104600 A1* | 5/2006 | Abrams | ................ | H04N 5/247 386/223 |
| 2007/0005795 A1* | 1/2007 | Gonzalez | .......... | G06F 17/30017 709/232 |
| 2007/0200920 A1* | 8/2007 | Walker et al. | ............. | 348/14.08 |
| 2008/0066123 A1* | 3/2008 | Igoe | .................... | H04L 12/2809 455/41.3 |
| 2008/0281926 A1* | 11/2008 | Walter | ................... | H04N 7/163 709/206 |
| 2009/0094657 A1* | 4/2009 | Miller | ............... | H04N 21/23602 725/118 |
| 2009/0305790 A1* | 12/2009 | Lu et al. | ......................... | 463/42 |
| 2010/0259682 A1* | 10/2010 | Unger | ................ | H04N 21/4122 348/569 |
| 2011/0055886 A1* | 3/2011 | Bennett | ................... | H04L 63/18 725/116 |
| 2011/0061070 A1* | 3/2011 | Oh | ..................... | H04N 7/17318 725/25 |
| 2011/0179456 A1* | 7/2011 | Bar-Niv | .......... | H04N 21/43615 725/85 |
| 2011/0299448 A1* | 12/2011 | Meier et al. | ................... | 370/312 |
| 2012/0011553 A1* | 1/2012 | Maddali et al. | .............. | 725/106 |
| 2012/0054806 A1* | 3/2012 | Reznic et al. | ................. | 725/81 |
| 2012/0060100 A1* | 3/2012 | Sherwood et al. | ................... | 715/748 |
| 2013/0111515 A1* | 5/2013 | Mehta et al. | ................... | 725/24 |
| 2014/0181887 A1* | 6/2014 | Moon et al. | ................. | 725/133 |

OTHER PUBLICATIONS

"Wi-Fi Display Technical Specification Version 1.0.0", WI-FI Alliance Specification, Aug. 24, 2012 (Aug. 24, 2012), p. 149pp, XP009172467.

* cited by examiner

| Field | Size (Octets) | Value | Description |
|---|---|---|---|
| Subelement ID | 1 | Predetermined | Identifying the type of WFD subelement. |
| Length | 2 | 6 | Length of the following fields of the subelement. |
| WFD Group Session Identifier | 4 | | Unique Group Session Identifier assigned by the Source during RTSP session establishment for the Group WFD session. If the group session has not started, this field contains all zeros. |
| WFD Group Session Type | 1 | | Bitmap specifying the type of the Group Session (first 4 bits indicating the type: Source Centric, Master Sink Centric etc.), and the type of the port for RTSP protocol handling the group session (last 4 bits indicating TCP port, UDP port, both TCP and UDP etc.). |
| Group Session Management Control Port Info | 2 | Valid UDP or TCP Port | The TCP or UDP port at which the WFD Device shall listen for RTSP messages for a group session. |
| Supported Group Multicast Methods | 7 | | Bitmap (first 8 bits) indicating support for Group Addressed Frame delivery by the MAC layer (e.g. no Group Addressed delivery support, DMS only, GCR with Block Ack, GCR with Unsolicited Retries). When any of the bit for GCR with Block Ack or GCR with Unsolicited Retries is set, the next 6 bytes shall include the GCR Group Address. Otherwise, the GCR Group Address info sub-field is reserved. |

FIG. 11A

| Field | Size (Octets) | Value | Description |
|---|---|---|---|
| Mandatory Parameters for Group | | Optional | Minimum required support for a common audio/video format, latency/buffer capability and other parameters |
| WFD Group Member Info Descriptor | Sum of all Member Info (7 octets * number of members) | | First octet indicates the Type and Status of the member device (Master Sink or Regular Sink, Multicast capable or Unicast only etc.)<br><br>The last 6 octets are the MAC address of the device (or a unique identifier).<br><br>When only one entry (7 bytes) is present, and the MAC address field contains all zeros, the first octet only indicates the number of active devices in the group (count of the members only). |

FIG. 11B

SESSION MANAGEMENT AND CONTROL PROCEDURES FOR SUPPORTING MULTIPLE GROUPS OF SINK DEVICES IN A PEER-TO-PEER WIRELESS DISPLAY SYSTEM

TECHNICAL FIELD

The described technology generally relates to wireless streaming of multimedia content. More specifically, the disclosure is directed to session management and control procedures for supporting multiple groups of sink devices in a peer-to-peer wireless display system.

BACKGROUND

Recent advances have been made to allow direct streaming of video and audio directly from one wireless communication enabled device to another. One such system is known as "Miracast." Miracast is a trademark for a wireless (e.g., IEEE 802.11 family of wireless protocols or "Wi-Fi") display protocol promulgated by the Wi-Fi Alliance. As used herein, the term Miracast refers to the current form of the Wi-Fi Alliance's display sharing protocol, also known as Wi-Fi Display (WFD). The Miracast specification is designed for streaming any type of video bitstream from a source device to a sink device. As one example, a source may be a smart phone, and a sink may be a television set. Although in typical IEEE 802.11 wireless networks, client devices communicate through an access point (AP) device, protocols exist (such as Wi-Fi Direct) that support direct device communications. The Miracast system uses such protocols for sending display data from one device to another, such as from a smart phone to a television or computer, or vice-versa. The Miracast system involves sharing the contents of a frame buffer and speaker audio of the source device to a remote display/speaker device (sink) over a Wi-Fi connection.

The Miracast protocol involves the source capturing the RGB data from the frame buffer and any PCM (Pulse Coded Modulation) audio data from the audio subsystem. The content of the frame buffer may be derived from application programs or a media player running on the source. The source then compresses the video and audio content and transmits the data to the sink device. Upon receiving the bitstream, the sink decodes and renders the bitstream on its local display and/or speakers.

The current Miracast specification primarily handles session establishment and control for multimedia streaming from one source to one sink device. To support sharing media content from one source device to several sink devices, Wi-Fi Display session management requires enhancements to allow controlling of media streaming to a group of sink devices.

SUMMARY

An apparatus configured to transmit multimedia content to a plurality of sink devices is provided. The apparatus comprises a processor configured to connect to each of the plurality of sink devices with a Wi-Fi peer-to-peer connection. The processor is further configured to receive capability information from each of the Wi-Fi peer-to-peer connected sink devices requesting a particular multimedia content. The processor is further configured to generate a control message including a group session ID and a transport port number, the transport port number to be used for communicating to each of the Wi-Fi peer-to-peer connected sink devices the particular multimedia content associated with the group. The processor is further configured to transmit to each of the Wi-Fi peer-to-peer connected sink devices the control message. The processor is further configured to determine a set of streaming parameters for the Wi-Fi peer-to-peer connected sink devices associated with the group session ID. The processor is further configured to transmit, using the transport port number and according to the set of streaming parameters, the particular multimedia content to each of the Wi-Fi peer-to-peer connected sink devices.

A method of transmitting multimedia content to a plurality of sink devices is provided. The method comprises connecting to each of the plurality of sink devices with a Wi-Fi peer-to-peer connection. The method further comprises receiving capability information from each of the Wi-Fi peer-to-peer connected sink devices requesting a particular multimedia content. The method further comprises generating a control message including a group session ID and a transport port number, the transport port number to be used for communicating to each of the Wi-Fi peer-to-peer connected sink devices the particular multimedia content associated with the group. The method further comprises transmitting to each of the Wi-Fi peer-to-peer connected sink devices the control message. The method further comprises determining a set of streaming parameters for the Wi-Fi peer-to-peer connected sink devices associated with the group session ID. The method further comprises transmitting, using the transport port number and according to the set of streaming parameters, the particular multimedia content to each of the Wi-Fi peer-to-peer connected sink devices.

An apparatus for transmitting multimedia content to a plurality of sink devices is provided. The apparatus comprises means for connecting to each of the plurality of sink devices with a Wi-Fi peer-to-peer connection. The apparatus further comprises means for receiving capability information from each of the Wi-Fi peer-to-peer connected sink devices requesting a particular multimedia content. The apparatus further comprises means for generating a control message including a group session ID and a transport port number, the transport port number to be used for communicating to each of the Wi-Fi peer-to-peer connected sink devices the particular multimedia content associated with the group. The apparatus further comprises means for transmitting to each of the Wi-Fi peer-to-peer connected sink devices the control message. The apparatus further comprises means for determining a set of streaming parameters for the Wi-Fi peer-to-peer connected sink devices associated with the group session ID. The apparatus further comprises means for transmitting, using the transport port number and according to the set of streaming parameters, the particular multimedia content to each of the Wi-Fi peer-to-peer connected sink devices.

A non-transitory computer-readable medium comprising code that, when executed, causes an apparatus to transmit multimedia content to a plurality of sink devices is provided. The medium further comprises code that, when executed, causes an apparatus to connect to each of the plurality of sink devices with a Wi-Fi peer-to-peer connection. The medium further comprises code that, when executed, causes an apparatus to receive capability information from each of the Wi-Fi peer-to-peer connected sink devices requesting a particular multimedia content. The medium further comprises code that, when executed, causes an apparatus to generate a control message including a group session ID and a transport port number, the transport port number to be used for communicating to each of the Wi-Fi peer-to-peer connected sink devices the particular multimedia content associated with the group. The medium further comprises code that, when executed, causes an apparatus to transmit to each of the Wi-Fi peer-to-peer connected sink devices the control message. The medium further comprises code that, when executed, causes an apparatus to determine a set of streaming parameters for the Wi-Fi peer-to-peer connected sink devices associated with the group session ID. The medium further comprises code that, when executed, causes an apparatus to transmit, using the transport port number and according to the set of streaming parameters, the particular multimedia content to each of the Wi-Fi peer-to-peer connected sink devices.

BRIEF DESCRIPTION OF THE DRAWINGS

FIG. 11A illustrates an example subelement content layout for Wi-Fi Display group session management and continues onto FIG. 11B.

FIG. 11B further illustrates the example subelement content layout for the Wi-Fi Display group session management of FIG. 11A.

Figure 1A:
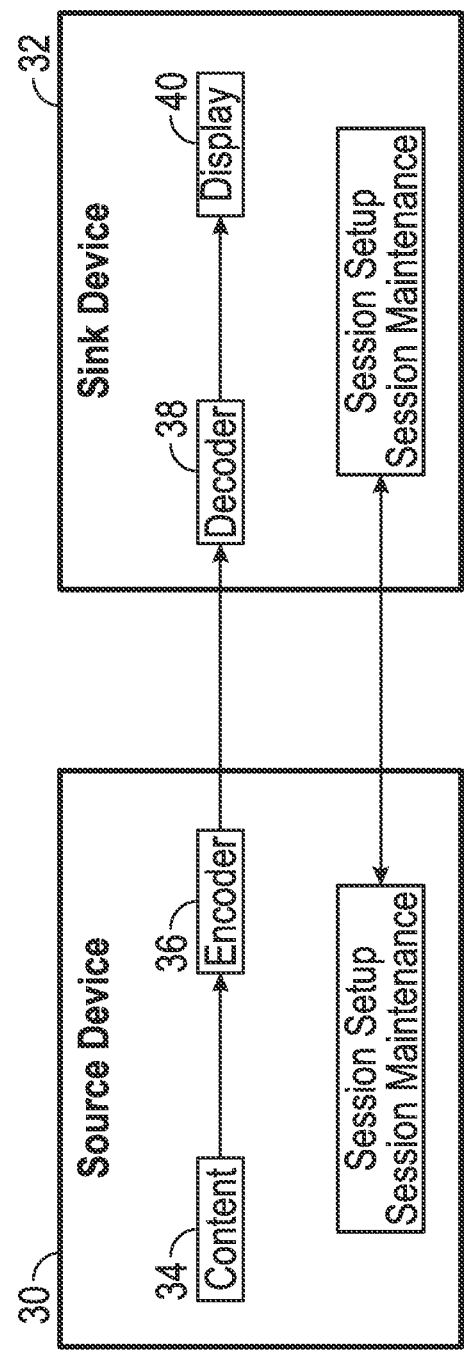
FIG. 1A is a block diagram of source and sink devices in one implementation of a Miracast multimedia streaming system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As mentioned above, the current Miracast specification primarily handles session establishment and control for multimedia streaming from one source to one sink device. It may be possible to extend some implementations to establish individual Wi-Fi Display (WFD) sessions from a source to each of multiple sink devices and stream multimedia content to each sink. However, the session establishment, session control, and media payload processing requires maintaining separate protocol stacks and network resources (e.g., TCP/UDP ports), and it is beyond the scope of the current Miracast specification. Additionally, the complexity and bandwidth requirements of this approach may limit such implementations to a small number of sink devices or to low-quality media formats. Due to the lack of control and flexibility for multiple session handling (e.g., as multicast or broadcast), this approach may also result in individual sink devices becoming out-of-sync. Furthermore, such implementations may not be interoperable among various products. To support sharing media content from one source device to several sink devices, Wi-Fi Display session management requires enhancements to allow controlling of media streaming to a group of sink devices. This enhancement may come in the form of new configurations for session establishment, session control, and data plane handling for the multiple device (1:N) topology.

The present disclosure is directed to systems and methods that allow a first device, referred to herein as a source, to deliver multimedia content to one or more second devices, referred to herein as sinks, for display on the second device. In some implementations, each device is capable of communicating wirelessly according to one or more of the IEEE 802.11 families of wireless communication protocols, which may be referred to herein as "Wi-Fi." Although such devices typically communicate through an access point (AP), rather than directly, protocols have been developed that allow source devices to transmit multimedia content to sink devices directly, without using any AP or other intermediary. As described above, one such protocol is known as Miracast. Enhancements and extensions of this protocol are set forth below. These enhancements and extensions have application not just to Miracast, but also to any display sharing device or protocol, system, or method allowing transmission, reception, and presentation of display data on and between devices connected wirelessly in a local environment, where "local" refers generally to the range of a wireless LAN connection, such as within a room, building, and the like.

In the present state of the Miracast specification, streaming multimedia content to a group of sinks is not supported. The capability negotiation and session establishment is limited to one source and one sink device. Further, streaming control for any multicast/group-cast of content may not be supported. To address at least these issues, the RTSP (Real Time Streaming Protocol) control plane currently used in Miracast for peer-to-peer streaming control may be extended to manage a group of sink devices. Further, the PES (packetized elementary stream), MPEG2-TS transport, and RTP packetization may be done per group basis based on the capabilities of the group of sink devices. The MPEG2-TS multiplexing may include content for multiple programs. Further, knowledge of MAC layer capability for Group Addressed frame delivery by the RTSP control stack and the content processing data plane may enable efficient setting of session parameters.

Figure 1B:
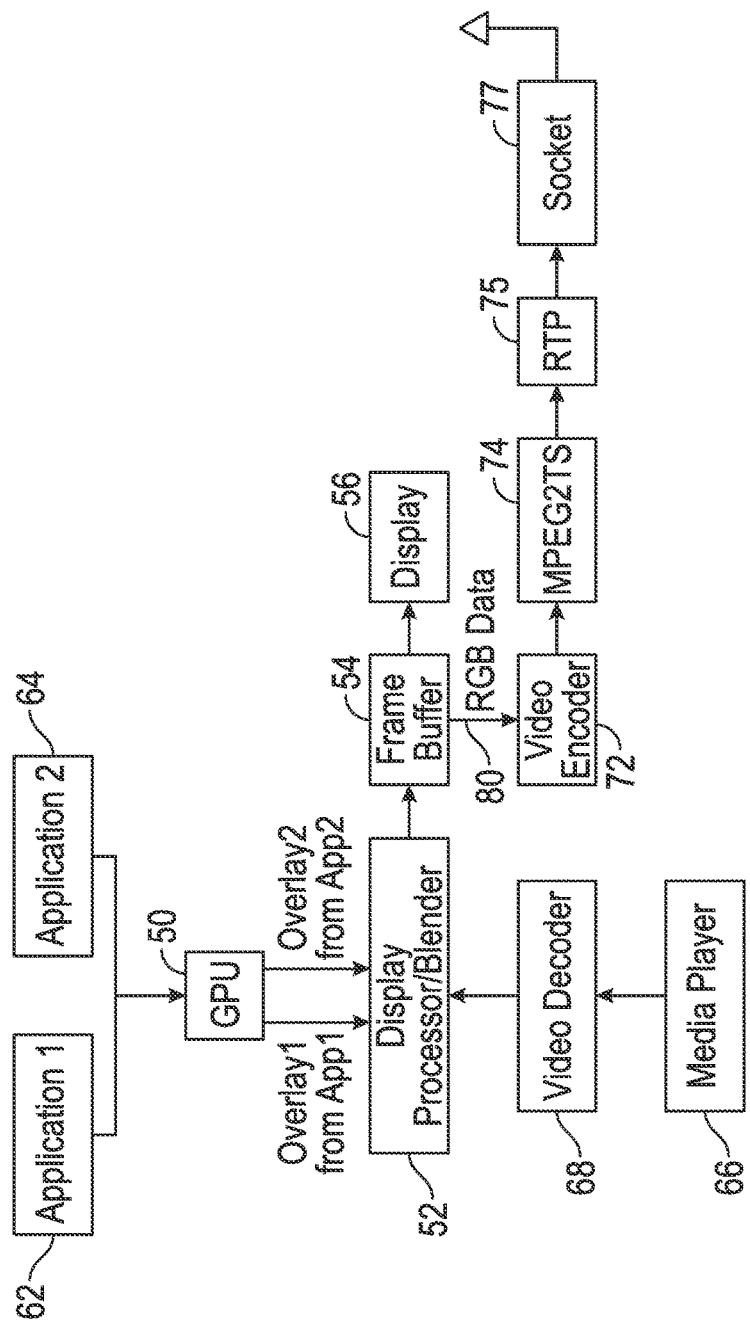
FIG. 1B is a block diagram of a source device in one implementation of the Miracast multimedia streaming system of FIG. 1A.
Figure 1C:
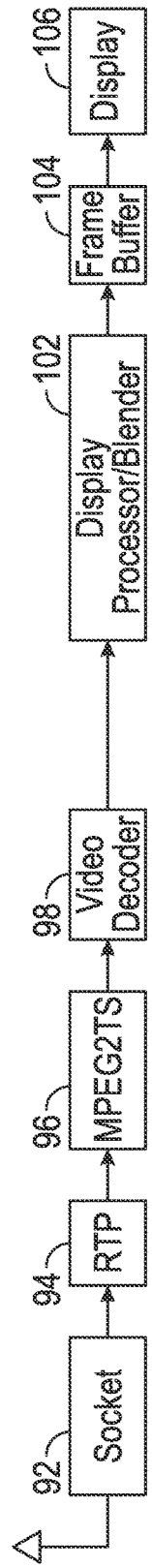
FIG. 1C is a block diagram of a sink device in one implementation of the Miracast multimedia streaming system of FIG. 1A.

Referring now to FIGS. 1A through 1C, in a Miracast system, additional control communications and transfer protocol negotiation can occur between a source device 30 and a sink device 32. As shown in FIG. 1A, at the source 30, display data 34 is routed to an encoder 36. In conventional Miracast systems, the encoder 36 and decoder 38 use H.264 protocol for encoding and decoding of the video, respectively. This data is then transmitted wirelessly to the sink 32, using an MPEG2 transport stream with Real Time Transport Protocol (RTSP) messaging in conventional Miracast systems. When received at the sink 32, the data is routed to a corresponding decoder 38 and sent to a display 40 on the sink 32. Control signals are also passed between the source 30 and sink 32. In the conventional Miracast system, control signals for one peer-to-peer session setup and session maintenance are utilized.

Referring now to FIG. 1B, a block diagram of one implementation of a source device 30 of FIG. 1 is illustrated. In FIG. 1B, the source device includes a Graphics Processing Unit (GPU) 50, a Display Processor/Blender 52, a frame buffer 54, and a display 56. The source may be running several applications such as Application 1 62 and Application 2 64 which may provide display data for presentation to a user. Under the control of the source operating system, the GPU 50 and the Display Processor/Blender 52 prepare the display data and fill the frame buffer 54, for forwarding to the display 56. The source may also include a media player 66 which also routes content to the Display Processor/Blender 52 through a video decoder.

Data flow in a conventional Miracast multimedia streaming in mirroring mode between one source to one sink device is illustrated by FIG. 1B. When Miracast mirroring is being performed, the successive frames of pixel data in the frame buffer 54 are routed to a video encoder 72 along data path 80, the encoded data is assembled into an MPEG2 transport stream by module 74, combined with RTP messaging data by module 75, and routed to a socket 77 for transmission to the sink device 32. In conventional Miracast, the encoder 72 is an H.264 encoder and the socket is a UDP (User Datagram Protocol) socket, with no other options supported.

A sink device 32 is illustrated in FIG. 1C. In the sink, a socket 92 receives the incoming data stream, RTP header information is extracted with module 94, and display data is extracted with module 96. The display data may be routed to a video decoder 98, then to a Display Processor/Blender 102, which fills a frame buffer 104 for presentation on the display 106. In conventional Miracast, the video decoder 98 is an H.264 decoder, which is required in any sink device compatible with the Miracast standard.

Figure 2:
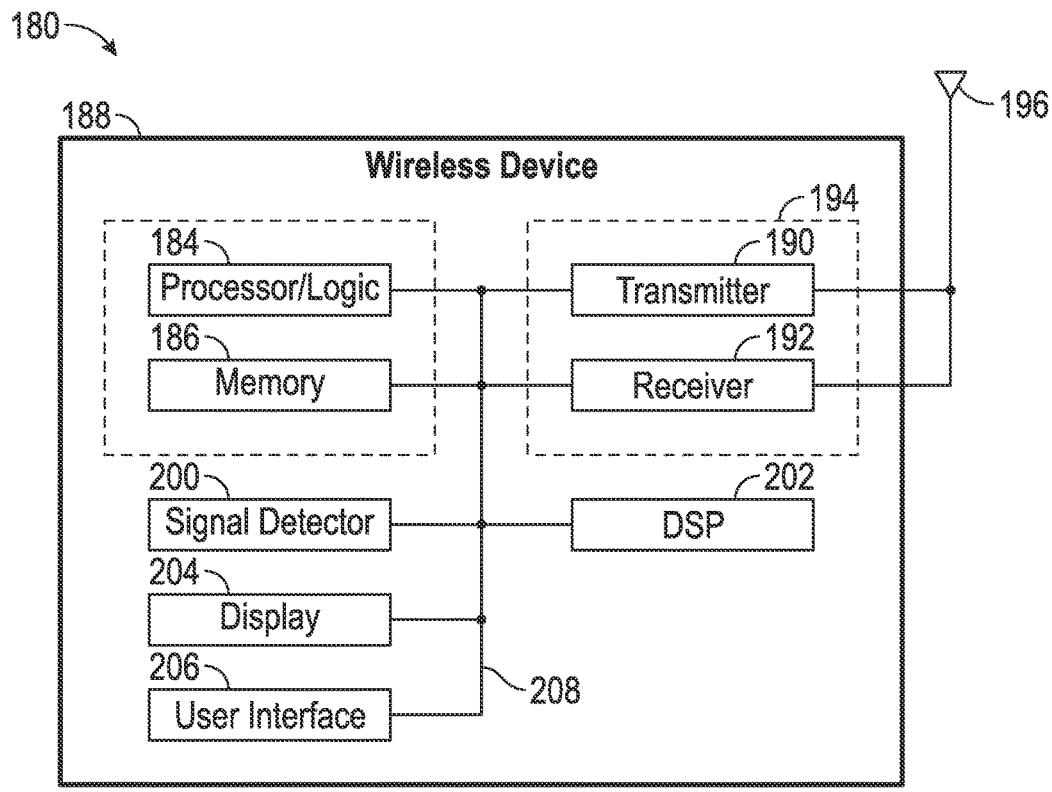
FIG. 2 illustrates various components that may be utilized in a wireless device that may be employed within the Miracast multimedia streaming system of FIG. 1A.

FIG. 2 illustrates various components that may be utilized in a wireless device 180 that may be employed within the Miracast multimedia streaming system described above. The wireless device 180 is an example of a device that may be configured to implement the various methods described herein.

The wireless device 180 may include a processor 184 which controls operation of the wireless device 180. The processor 184 may also be referred to as a central processing unit (CPU). Memory 186, which may include both read-only memory (ROM) and random access memory (RAM), provides instructions and data to the processor 184. A portion of the memory 186 may also include non-volatile random access memory (NVRAM). The processor 184 typically performs logical and arithmetic operations based on program instructions stored within the memory 186. The instructions in the memory 186 may be executable to implement the methods described herein. For example, depending on whether the device is a source 30, sink 32, or both, the blocks of FIGS. 1A, 1B, and 1C may be implemented with the processor 184 and memory 186. The processor 184 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 180 may also include a housing 188 that may include a transmitter 190 and a receiver 192 to allow transmission and reception of data between the wireless device 180 and a remote location. The transmitter 190 and receiver 192 may be combined into a transceiver 194. An antenna 196 may be provided and electrically coupled to the transceiver 194. The wireless device 180 may also include (not shown) multiple transmitters, multiple receivers, multiple transceivers, and/or multiple antennas.

The wireless device 180 may also include a signal detector 200 that may be used in an effort to detect and quantify the level of signals received by the transceiver 194. The signal detector 200 may detect such signals as total energy, energy per subcarrier per symbol, power spectral density and other signals. The wireless device 180 may also include a digital signal processor (DSP) 202 for use in processing signals. The DSP 202 may be configured to generate a data unit for transmission. The wireless device 180 may further comprise a display 204, and a user interface 206. The user interface 206 may include a touchscreen, keypad, a microphone, and/or a speaker. The user interface 206 may include any element or component that conveys information to a user of the wireless device 180 and/or receives input from the user.

The various components of the wireless device 180 may be coupled together by one or more bus systems 208. The bus systems 208 may include a data bus, for example, as well as a power bus, a control signal bus, and a status signal bus in addition to the data bus. Those of skill in the art will appreciate the components of the wireless device 180 may be coupled together or accept or provide inputs to each other using some other mechanism.

Although a number of separate components are illustrated in FIG. 2, one or more of the components may be combined or commonly implemented. For example, the processor 184 may be used to implement not only the functionality described above with respect to the processor 185, but also to implement the functionality described above with respect to the signal detector 200 and/or the DSP 202. Further, each of the components illustrated in FIG. 7 may be implemented using a plurality of separate elements. Furthermore, the processor 184 may be used to implement any of the components, modules, circuits, or the like described below, or each may be implemented using a plurality of separate elements.

Figure 3:
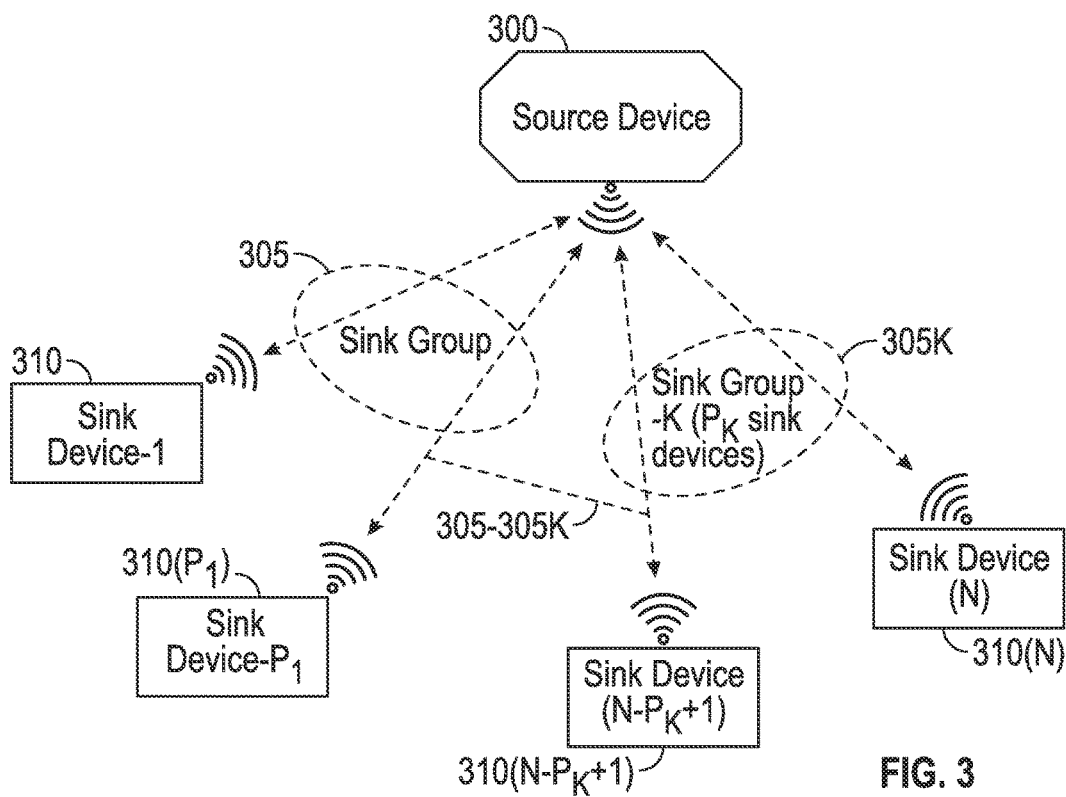
FIG. 3 illustrates a topology for media streaming from a source device to a number of sink groups.

FIG. 3 illustrates a topology for media streaming from a source device 300 to K sink groups 305-305K. This WFD session demonstrates 1:N topology. The N sink devices (310-310N) may be grouped into the K sink groups 305-305K. Each group (G(k), k=1, ..., K) may have $P_k$ sink devices such that $\Sigma_{k=1}^{K} P_k = N$, to send a media stream using multiple transmissions (e.g., unicast, single multicast, group-cast, etc.) from the source device 300. The source device 300 and the N sink devices 310-310N may use P2P connections (e.g., Peer-to-Peer, Wi-Fi Direct, etc.). These procedures may also be implemented, for example, when using TDLS (tunneled direct link setup) connections. Further, the source device 300 may also be configured as a soft AP with the associated sink devices configured as regular Wi-Fi STAs. In one implementation, the N sink devices 310-310N in one of the K sink groups 305-305K may be part of a P2P group.

An example use case for this topology includes a smartphone or tablet (as the source device 300) streaming a multimedia clip to multiple laptops or tablets (as the N sink devices 310-310N). This example may include classroom sharing, such as presentations to a group. Another example may include a tablet (as the source device 300) sharing content from one window to sets of N sink devices 310-310N. There may be multiple groups of sink devices (305-305K), and each group may receive a distinct content stream from the source device 300. For example, multimedia content may be streamed to a group of tablets (as the N sink devices 310-310N), and the audio may be streamed to a common audio system. Another example may include a car headset unit (as the source device 300) with 3G/4G data connection sharing multimedia content from the Internet to tablets or wireless headsets (as the N sink devices 310-310N) in passenger seats. The content sent to each group of sinks 305-305K may be different from one another, e.g. rendering a movie clip on some devices while rendering only music on other devices.

Figure 4:
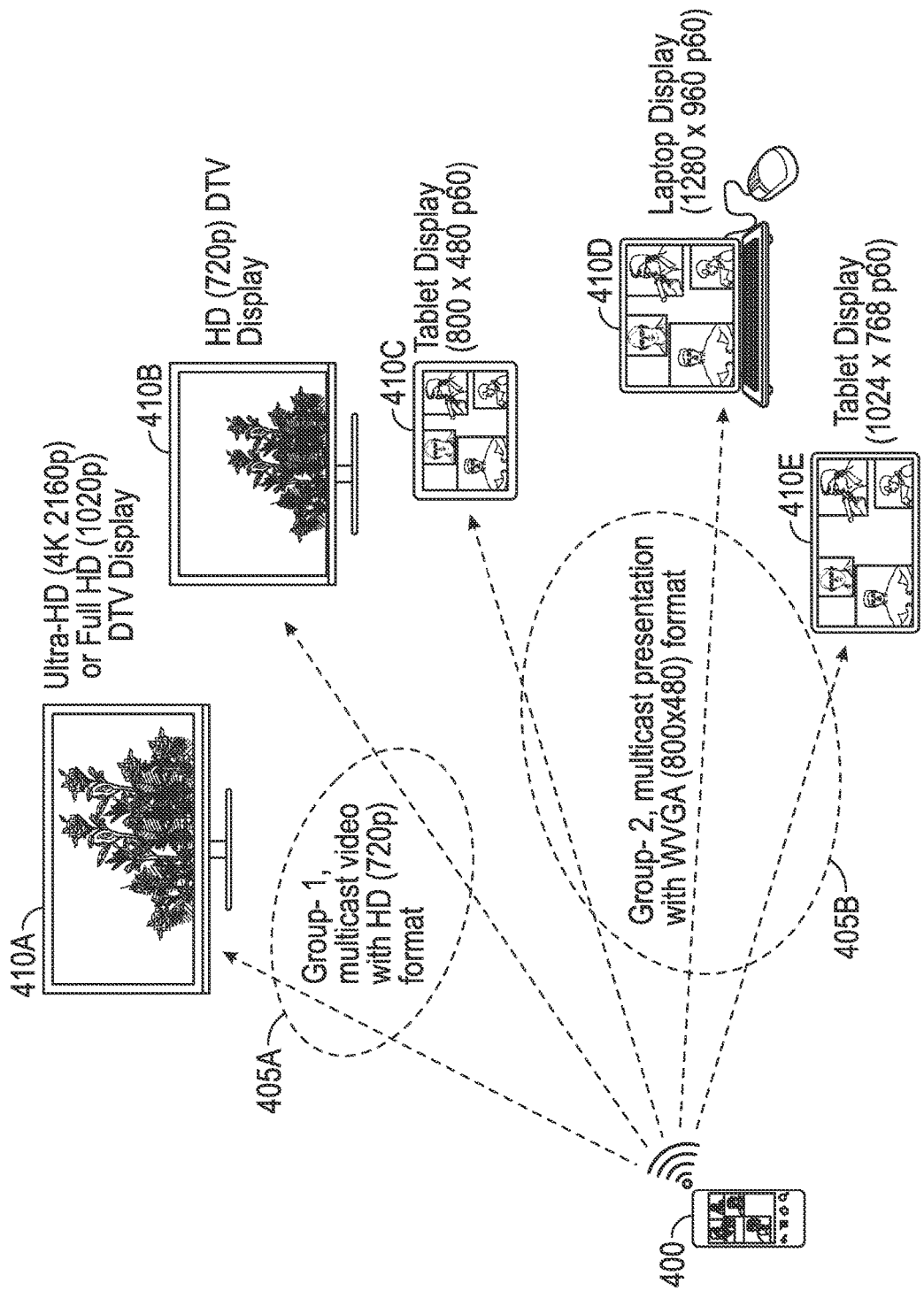
FIG. 4 illustrates a grouping example for media streaming from a source device to multiple sink groups.

FIG. 4 illustrates a grouping example for media streaming from a source device 400 (e.g., the source device 300 of FIG. 3) to multiple sink groups 405A and 405B (e.g., any of the K sink groups 305-305K of FIG. 3). In one example, the sink group 405A includes two sink devices 410A and 410B (e.g., any of the N sink devices 310-310N), and the sink group 405B includes three sink devices 410C, 410D, and 410E (e.g., any of the N sink devices 310-310N). In one example, the source device 400 may be a cellphone, and the sink group 405A may be used to transmit multicast video with 720p high-definition format video to the sink devices 410A and 410B, which may include, for example, an Ultra-HD (4K 2160p) or Full HD (1020p) DTV display capabilities of sink device 410A and an HD (720p) DTV Display capability in sink device 410B. Further, the sink group 405B may be used to transmit a multicast presentation with a WVGA (800×480) format to the sink devices 410C, 410D, and 410E, which may include, for example, two tablet displays capable of different maximum resolutions (e.g., 800×480 p60, 1024×768 p60, etc.) and a laptop display with a 1280×960 p60 resolution.

Figure 5:
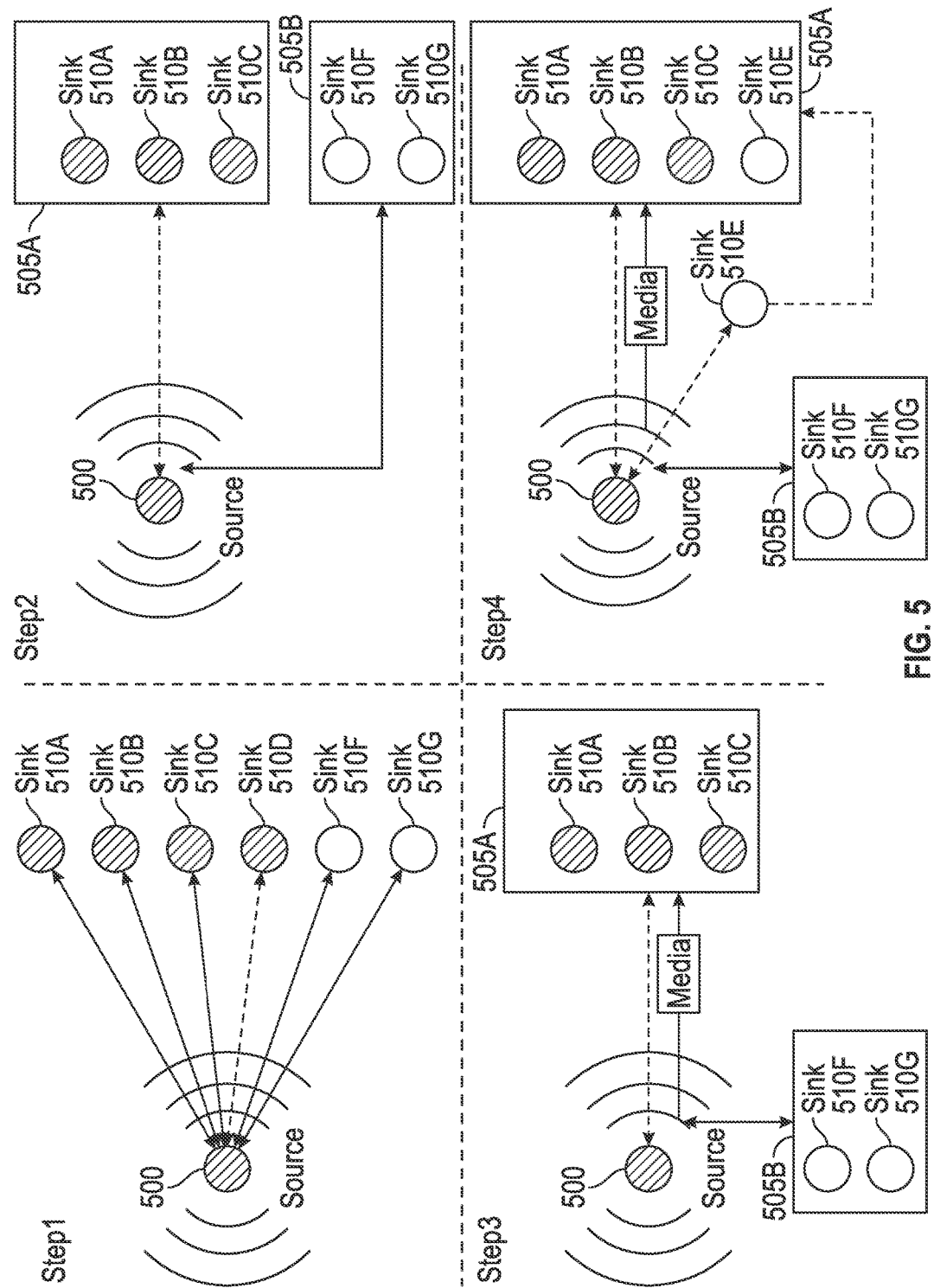
FIG. 5 illustrates an example series of steps for sink devices to join a source initiated and controlled group session.

FIG. 5 illustrates an example series of steps for sink devices to join a source initiated and controlled group session. This type of group session may also be referred to as a "Source Centric Group."

In Step 1, a peer-to-peer connection may be established between a source device 500 (e.g., the source device 300 of FIG. 3) and a group of sink devices 510A-510D (e.g., any of the N sink devices 310-310N). The peer-to-peer connection may also be referred to as a group session. To initiate the connection, a user may launch, from the source device 500, a Wi-Fi Display (WFD) application for handling multimedia streaming to a group of sink devices, which may cause the source device 500 to announce (e.g., advertise) its service and group session capabilities to the sink devices 510A-510D. This period of announcement may also be referred to as a P2P device discovery phase. When Multicast data delivery is supported or required by the MAC layer for multicast traffic (e.g., 802.11 Directed Multicast Service (DMS) or Group-cast with Retries (GCR)), the source device 500 may have already advertised its intent to be a group owner. In one embodiment, the source device 500 and the sink devices 510A-510D may use the L3 IGMP protocol (Internet Group Management Protocol-RFC 3376) for establishing the group membership.

To support the Wi-Fi Display group operation, RTSP messaging may be used for group sessions, due to its reliability in message exchanges as well as its handling of a large number of sink devices. Depending on the number of the sink devices in a group, different RTSP signaling and streaming control options may be used and advertised by the source device 500. For example, in the case that there are a large number of sink devices (not pictured), the source device 500 may use a RTSP with UDP (RTSPU) scheme (IETF RFC 2326) for its group session (e.g., common session) initiation request messages (e.g., methods such as ANNOUNCE or SETUP). More detail on this method and other RTSP-based methods are described below in regards to FIGS. 6-9.

Regardless of the RTSP method used, the RTSP messages may include information about the required capabilities for a sink device to join the group session, e.g., a common multimedia codec, a common multimedia format, a minimum latency or buffer capability, or supported multicast mechanisms (e.g., DMS or GCR). In some cases, the RTSP message may also include keep-alive timeout and response time limit information, which the source device 500 may set based on a maximum number of sink devices it intends to serve. The source device 500 may also set such information based on the appropriate MAC layer transmission schemes, such as unicast, non-GCR multicast, DMS, or GCR multicast. Each of the sink devices (e.g., 510A-510D and any additional sink devices not pictured) that support the required capabilities may respond to the broadcasted RTSP messages. The source device 500 may periodically retransmit the broadcasted RTSP messages. This ensures that all sink devices in range receive the RTSP messages and/or that any newly discovered sink devices have an opportunity to join the group session.

During the discovery period, the devices may exchange one or more MAC frames such as a probe request, probe response, or a beacon frame (not shown). Group session management information including the supported group type, any pre-configured codec and other parameters, and port information for session management control are included in these frames for peer-to-peer device discovery. Based on the exchanged information, one or more of the sink devices 510A-510G may decline to connect with the source device 500. In this example, the sink device 510D declines to connect with the source device 500. The source device 500 may then create a UDP port and send port information and other session control data (e.g., a multicast group) to the remaining sinks. Using that information and data, the devices may then form the peer-to-peer connection or group session.

In Step 2, the source device 500 may announce its group session configuration using a RTSP message with information about the data plane, which may include, for example, multimedia content formatting, multicast group information, and UDP port information. By announcing its group session configuration for the data plane, the source device 500 effectively invites other sink devices to join the existing group sessions. A minimum set of multimedia format requirements may be set as default mandatory parameters for a group session. In one embodiment, the common multimedia format for a group session may be fixed, e.g. a CEA 1280×720p, 24FPS resolution. In some implementations, the same multimedia content may be streamed in one common format to one group of sink devices and in another common format to another group of sink devices. In this example, a group session 505A consists of the sink devices 510A-510C and a group session 505B consists of the sink devices 510E-510G. The sink device 510D does not appear in either group session, because it declined the connection request in Step 1. The source device 500 may establish a group session when there are at least two sink devices with the same capabilities to group.

To increase efficiency and minimize processing, the source device 500 may select a predetermined number of sink devices in each group to be "Active Sink devices." Information regarding the Active Sink devices may be updated in the group session management data. The Active Sink devices may respond to the RTSP request messages sent by the source device 500. The rest of the sink devices, referred to as the "Passive Sink devices," may not respond to the RTSP request messages and may receive the multimedia content from the source device 500, and exchange their capability information in an unsolicited manner, e.g., the Passive Sink devices may only receive the content format used for streaming in a group session and the port information from the source device 500 as compared to the Active Sink devices.

In Step 3, the source device 500 may begin transmitting (e.g., streaming) multimedia content to the sink devices 510A-510C in the group session 505A. At any time during transmission, the multimedia content may be switched for a different multimedia content, which may have different codec or format requirements based on the native format of the media content. When the sink devices cannot support the native format of the content, transcoding to some other format may be required. In one implementation, the source device 500 may re-encode the content to a format common to all of the sink devices 510A-510C in the group session 505A. During the group session, the source device 500 may also periodically announce the group session configuration by using a RTSP message as in Step 2. The source device 500 may handle most of the streaming controls, such as "Pause," "Fast-Forward," "Rewind," formatting changes, etc.

In Step 4, a new sink device 510E may receive the group session configuration announcement message transmitted during Step 2 or 3 and join the group session 505A. Once the new sink device 510E has joined the group session 505A, it will also receive the multimedia content being transmitted to the group session 505A from the source device 500. New sink devices may request to join the group session at any time. Similarly, sink devices currently in the group session may request to leave the group at any time.

Figure 6A:
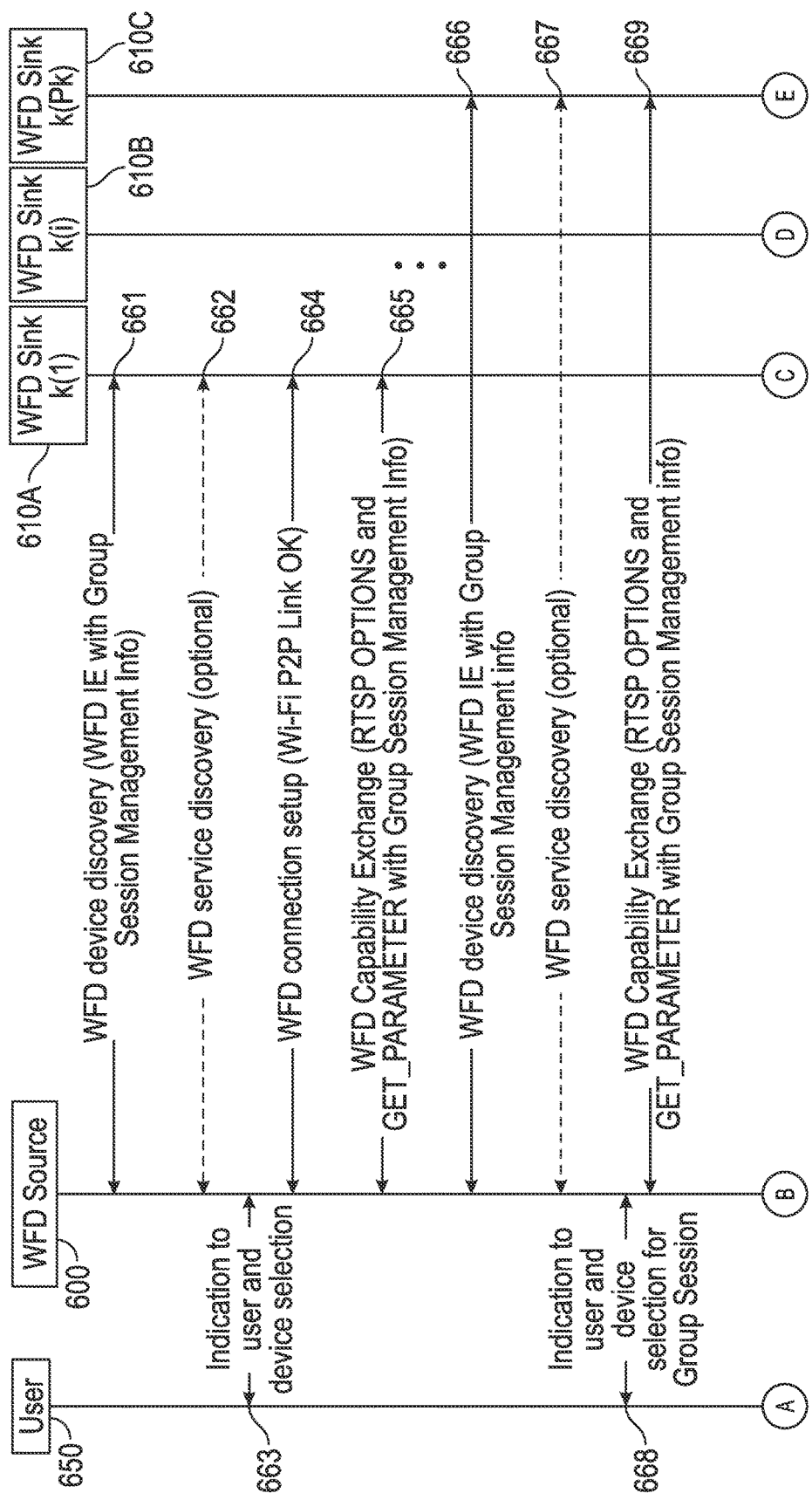
FIG. 6A illustrates one example implementation of a source-centric RTSP-based capability negotiation and group session establishment method between a Wi-Fi Display source device and a number of Wi-Fi Display sink devices and continues onto FIG. 6B.
Figure 6B:
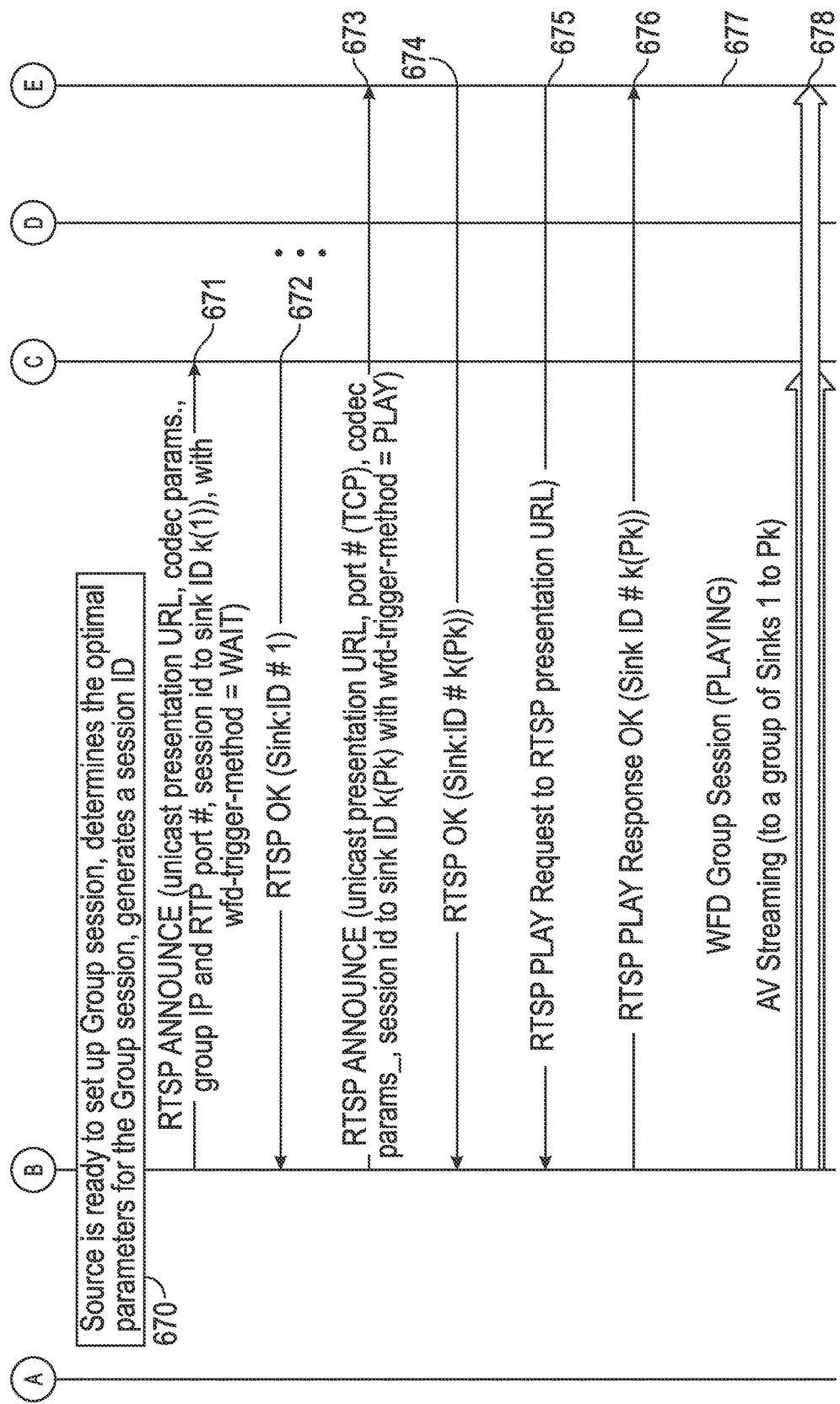
FIG. 6B further illustrates the example implementation of the source-centric RTSP-based capability negotiation and group session establishment method between the Wi-Fi Display source device and the number of Wi-Fi Display sink devices of FIG. 6A.

FIG. 6 (e.g., as illustrated by FIG. 6A and FIG. 6B taken as one continuing figure) illustrates one example implementation of a source-centric RTSP-based capability negotiation and group session establishment method between a Wi-Fi Display source device and a number of Wi-Fi Display sink devices. In the illustrated example, all of the sink devices are assumed to be in the same group. This method improves on the efficiency of the above discussed unicast RTSP messaging over TCP port with the addition of messages and parameters for group session establishment and control. In general, in this method, the source may establish individual RTSP connections for reliable control and enable multicast for media data during streaming within the group, which is suitable for a small number of sink devices. Additionally, as described in step 670, the source may generate a group session ID for autonomously initiating the group session without receiving SETUP request from the sinks.

At step 661, a Wi-Fi Display source 600 initiates a discovery phase with at least one of a Wi-Fi Display sink 610 (in this example, with a sink 610A). Discovery information exchanged during the discovery phase may include group session management and device capability information, as described above with respect to FIG. 5. The discovery phase may occur on a chosen channel (e.g., channel 1, 6, or 11), based on the amount of traffic on the channel. Further, the discovery information may be exchanged between the source 600 and sinks 610 via probe request and probe response frames.

At step 662, one or more of the sinks 610 may also exchange service discovery information with the source 600.

At step 663, the source 600 may indicate to a user 650 that steps 661 and 662 have occurred and notify the user 650 of which sink or sinks 610 have been discovered during the discovery phase (in this example, sink 610A has been selected).

At step 664, the source 600 may complete a connection setup with the sink or sinks 610 selected during the discovery phase. In some cases, the connection setup may be a Wi-Fi peer-to-peer link.

At step 665, the source 600 may exchange a capability information between itself and the sink or sinks 610 selected during the discovery phase. Such capability information may include, among other things, a multimedia codec, a multimedia format, a minimum latency or buffer capability, or supported multicast mechanisms (e.g., DMS or GCR). The source 600 may use RTSP OPTIONS followed by GET_PARAMETER commands by including the group session management information to exchange and set the capability information.

At step 666, the source 600 may initiate a continuing discovery phase with additional sinks 610 (in this example, with a sink 610B and 610C). Discovery information exchanged during the discovery phase may include group session management and device capability information. The exchange of information during the continuing discovery phase may occur one sink at a time, for example, the source 600 may exchange discovery information with the sink 610B and then exchange discovery information with the sink 610C.

At step 667, one or more of the additional sinks 610 (here, 610B and 610C) may also exchange service discovery information from the source 600.

At step 668, the source 600 may indicate to the user 650 that steps 666 and 667 have occurred and notify the user 650 of the number of sinks 610 that are present and meet the capability requirements (here, the sinks 610A, 610B, and 610C) have been selected during the discovery phases.

At step 669, the source 600 may exchange a capability information between itself and the additional sink or sinks 610 (here, 610B and 610C) selected during the continuing discovery phase. Such capability information may include, among other things, a multimedia codec, a multimedia format, a minimum latency or buffer capability, or supported multicast mechanisms (e.g., DMS or GCR). The source 600 may use RTSP OPTIONS, followed by GET_PARAMETER commands with the group session management information to exchange and set the capability information. The exchange of information during this phase may occur one sink at a time, for example, the source 600 may exchange capability information with the sink 610B and then exchange capability information with the sink 610C.

At step 670, the source 600 may be ready to establish a group session. In its establishment of the group session, the source 600 may determine the optimal parameters for the group session based on the capability information exchange between the sink or sinks selected in the above steps. The source 600 may additionally generate a session ID for the group session.

At step 671, the source 600 may enter an announcement phase during which it may send an announcement of the RTSP group session information to one of the sinks 610 (in this case, the sink 610A). The source 600 may use an RTSP ANNOUNCE command to send the announcement. The announcement may include, among other things, information regarding a presentation URL, codec parameters, a group IP address, an RTP port number, and a session ID to sink with the particular sink 610 (here, the sink 610A). During the announcement phase, the source 600 may operate under the WFD-TRIGGER-METHOD=WAIT command, during which it will wait to play a multimedia content.

At step 672, the sink 610 (here, the sink 610A) may send an RTSP OK message to the source 600, indicating that it has received the announcement of step 671 and that it is ready to receive multimedia content.

At step 673, the source 600 may enter a continuing announcement phase during which it may send an announcement of the RTSP group session information to the additional sinks 610 (in this case, the sinks 610B and 610C). The source 600 may again use the RTSP ANNOUNCE command to send the continuing announcement. The continuing announcement may include, among other things, information regarding the presentation URL, codec parameters, the group IP address, the RTP port number, and a session ID to sink with the particular additional sinks 610 (here, the sinks 610B and 610C). During the continuing announcement phase, the source 600 may operate under the WFD-TRIGGER-METHOD=PLAY command, during which the source 600 may be ready to play the multimedia content to the connected sinks 610 (here, the sinks 610A, 610B, and 610C).

At step 674, the additional sink 610 (here, the sinks 610B and 610C) may send an RTSP OK message to the source 600, indicating that they have received the announcement of step 673 and that they are ready to receive multimedia content.

At step 675, one or more of the connected sinks 610 may send a play request (e.g., an RTSP PLAY request) to the source 600 via the RTSP presentation URL.

At step 676, in response to the play request of step 675, the source 600 may notify the requesting sinks 610 that playing will begin, e.g., via a "PLAY response OK" message.

At step 677, the source 600 may begin streaming the multimedia content over the group session to the requesting sinks 610. During this time, the source 600 may indicate a status of "PLAYING."

At step 678, the requesting sinks 610 may receive the streaming multimedia content from the source 600.

In one implementation, the source 600 may elect to skip the individual sinks 610 capability exchanges (as described in steps 665 and 669 above) and start the group session with a predetermined set of multimedia content parameters (e.g., format of content). Instead, the predetermined set of multimedia content parameters may be obtained from the sinks 610 during the device or service discovery phases (as described in steps 662 and 667 above).

Figure 7A:
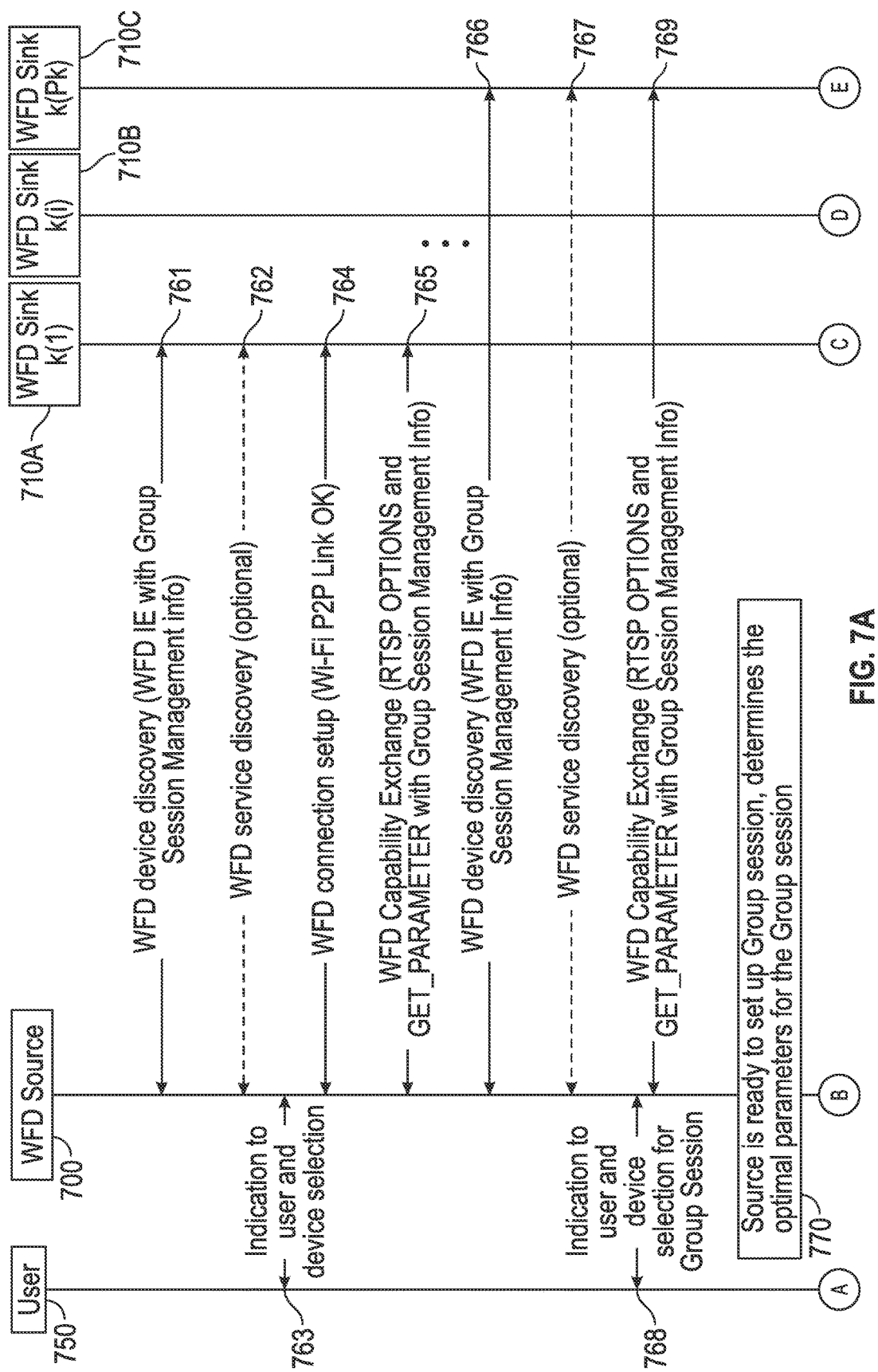
FIG. 7A illustrates another example implementation of a source-centric RTSP-based group session establishment and capability negotiation method between a Wi-Fi Display source device and a number of Wi-Fi Display sink devices and continues onto FIG. 7B.
Figure 7B:
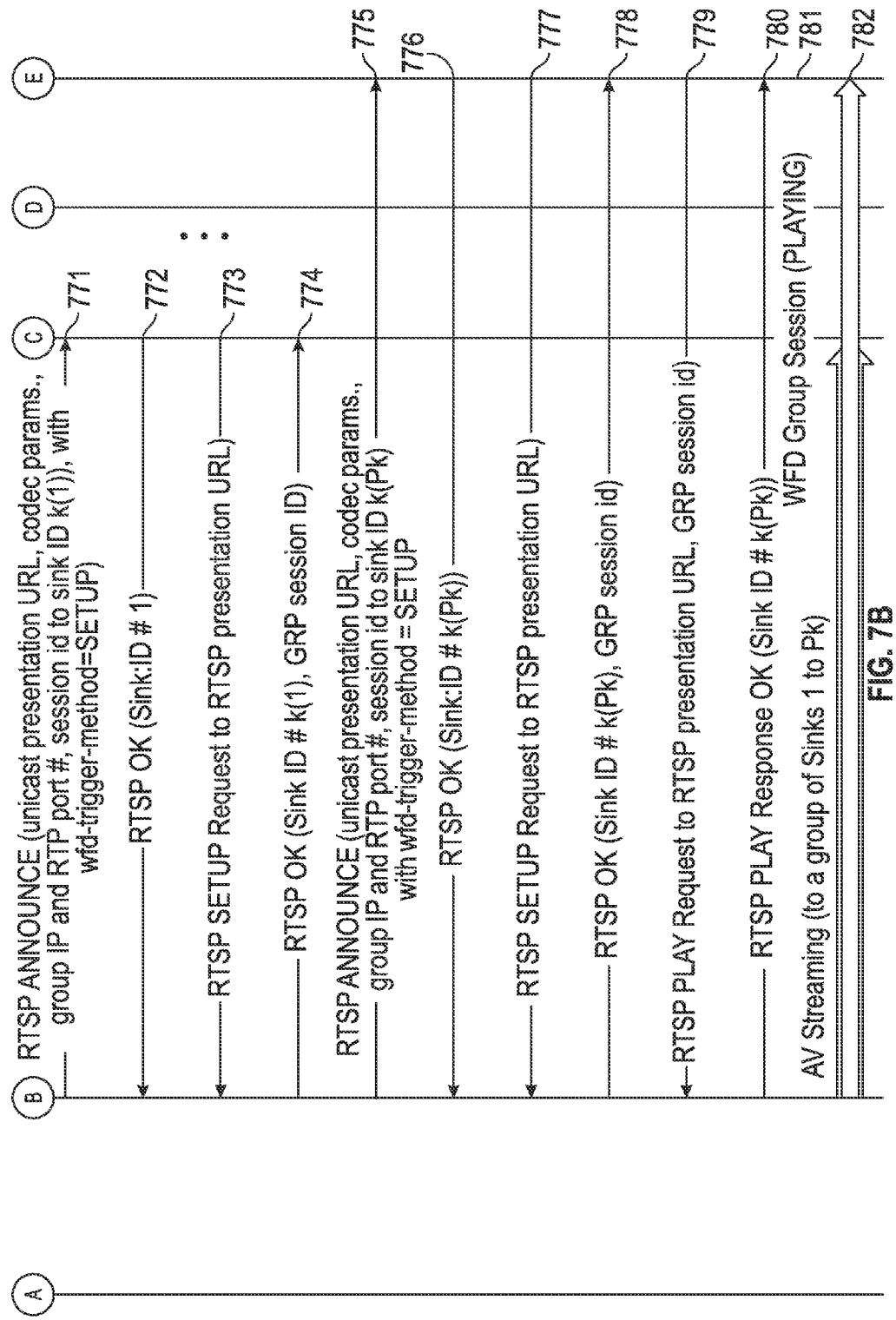
FIG. 7B further illustrates the example implementation of the source-centric RTSP-based group session establishment and capability negotiation method between the Wi-Fi Display source device and the number of Wi-Fi Display sink devices of FIG. 7A.

FIG. 7 (e.g., as illustrated by FIG. 7A and FIG. 7B taken as one continuing figure) illustrates another example implementation of a source-centric RTSP-based group session establishment and capability negotiation method between a Wi-Fi Display source device and a number of Wi-Fi Display sink devices. In the illustrated example, all of the sink devices are assumed to be in the same group. This method again improves on the efficiency of the above discussed TCP unicast RTSP with the addition of messages and parameters for group session establishment and control. In general, in this method, the source may establish individual RTSP connections for reliable control and enable multicast for media data during streaming within the group, which is suitable for a small number of sink devices. Additionally, as described below, and in comparison to the method described in FIG. 6, the source may perform a setup exchange with one of the selected sink devices.

At step 761, a Wi-Fi Display source 700 initiates a discovery phase with at least one of a Wi-Fi Display sink 710 (in this example, with a sink 710A). Discovery information exchanged during the discovery phase may include group session management and device capability information, as described above with respect to FIG. 5. The discovery phase may occur on a chosen channel (e.g., channel 1, 6, or 11), based on the amount of traffic on the channel. Further, the discovery information may be exchanged between the source 700 and sinks 710 via probe request and probe response frames.

At step 762, one or more of the sinks 710 may also exchange service discovery information with the source 700.

At step 763, the source 700 may indicate to a user 750 that steps 761 and 762 have occurred and notify the user 750 of which sink or sinks 710 have been discovered during the discovery phase (in this example, sink 710A has been selected).

At step 764, the source 700 may complete a connection setup with the sink or sinks 710 selected during the discovery phase. In some cases, the connection setup may be a Wi-Fi peer-to-peer link.

At step 765, the source 700 may exchange a capability information between itself and the sink or sinks 710 selected during the discovery phase. Such capability information may include, among other things, a multimedia codec, a multimedia format, a minimum latency or buffer capability, or supported multicast mechanisms (e.g., DMS or GCR). The source 700 may use RTSP OPTIONS and GET_PARAMETER commands along with the group session management information to exchange and set the capability information.

At step 766, the source 700 may initiate a continuing discovery phase with additional sinks 710 (in this example, with a sink 710B and 710C). Discovery information exchanged during the discovery phase may include group session management and device capability information. The exchange of information during the continuing discovery phase may occur one sink at a time, for example, the source 700 may exchange discovery information with the sink 710B and then exchange discovery information with the sink 710C.

At step 767, one or more of the additional sinks 710 (here, 710B and 710C) may also exchange service discovery information from the source 700.

At step 768, the source 700 may indicate to the user 750 that steps 766 and 767 have occurred and notify the user 750 of the number of sinks 710 that are present and meet the capability requirements (here, the sinks 710A, 710B, and 710C) have been selected during the discovery phases.

At step 769, the source 700 may exchange a capability information between itself and the additional sink or sinks 710 (here, 710B and 710C) selected during the continuing discovery phase. Such capability information may include, among other things, a multimedia codec, a multimedia format, a minimum latency or buffer capability, or supported multicast mechanisms (e.g., DMS or GCR). The source 700 may use RTSP OPTIONS and GET_PARAMETER commands with the group session management information to exchange and set the capability information. The exchange of information during this phase may occur one sink at a time, for example, the source 700 may exchange capability information with the sink 710B and then exchange capability information with the sink 710C.

At step 770, the source 700 may be ready to establish a group session. In its establishment of the group session, the source 700 may determine the optimal parameters for the group session based on the capability information exchange between the sink or sinks selected in the above steps. As compared to the method described in FIG. 6, the source 700 may not generate a session ID for the group session at this time.

At step 771, the source 700 may enter an announcement phase during which it may send an announcement of the RTSP group session information to one of the sinks 710 (in this case, the sink 710A). The source 700 may use an RTSP ANNOUNCE command to send the announcement. The announcement may include, among other things, information regarding a presentation URL, codec parameters, a group IP address, an RTP port number, and a session ID to sink with the particular sink 710 (here, the sink 710A). During the announcement phase, the source 700 may operate under the WFD-TRIGGER-METHOD=SETUP command, during which it will wait for a setup request from an individual sink 710 (here, the sink 710A).

At step 772, the sink 710 (here, the sink 710A) may send an RTSP OK message to the source 700, indicating that it has received the announcement of step 771.

At step 773, the individual sink 710 (here, the sink 710A) may send an RTSP setup request via the RTSP presentation URL to the source 700.

At step 774, the source 700 may send to the individual sink 710 (here, the sink 710A) its confirmation and approval of the RTSP setup request. Contrary to FIG. 6, the source 700 may send the group session ID at this time.

At step 775, the source 700 may enter a continuing announcement phase during which it may send an announcement of the RTSP group session information to the additional sinks 710 (in this case, the sinks 710B and 710C). The source 700 may again use the RTSP ANNOUNCE command to send the continuing announcement. The continuing announcement may include, among other things, information regarding the presentation URL, codec parameters, the group IP address, the RTP port number, and a session ID to sink with the particular additional sinks 710 (here, the sinks 710B and 710C). During the continuing announcement phase, the source 700 may continue to operate under the WFD-TRIGGER-METHOD=SETUP command, during which the source 700 may wait for setup requests from the additional connected sinks 710 (here, the sinks 710B and 710C).

At step 776, the additional sinks 710 (here, the sinks 710B and 710C) may send an RTSP OK message to the source 700, indicating that they have received the announcement of step 775.

At step 777, the additional sinks 710 (here, the sinks 710B and 710C) may send RTSP setup requests via the RTSP presentation URL to the source 700.

At step 778, in response to the setup requests, the source 700 may send to the additional sinks 710 (here, the sinks 710B and 710C) its confirmation and approval of the RTSP setup requests. The source 700 may also send the group session ID at this time.

At step 779, one or more of the connected sinks 710 may send a play request (e.g., an RTSP PLAY request) to the source 700 via the RTSP presentation URL. The play request may be sent in accordance with the group session ID.

At step 780, in response to the play request of step 779, the source 700 may notify the requesting sinks 710 that playing will begin, e.g., via a "PLAY response OK" message.

At step 781, the source 700 may begin streaming the multimedia content over the group session to the requesting sinks 710. During this time, the source 700 may indicate a status of "PLAYING."

At step 782, the requesting sinks 710 may receive the streaming multimedia content from the source 700.

In one implementation, the source 700 may elect to skip the individual sinks 710 capability exchanges (as described in steps 765 and 769 above) and start the group session with a predetermined set of multimedia content parameters (e.g., format of content). Instead, the predetermined set of multimedia content parameters may be obtained from the sinks 710 during the device or service discovery phases (as described in steps 762 and 767 above).

Figure 8A:
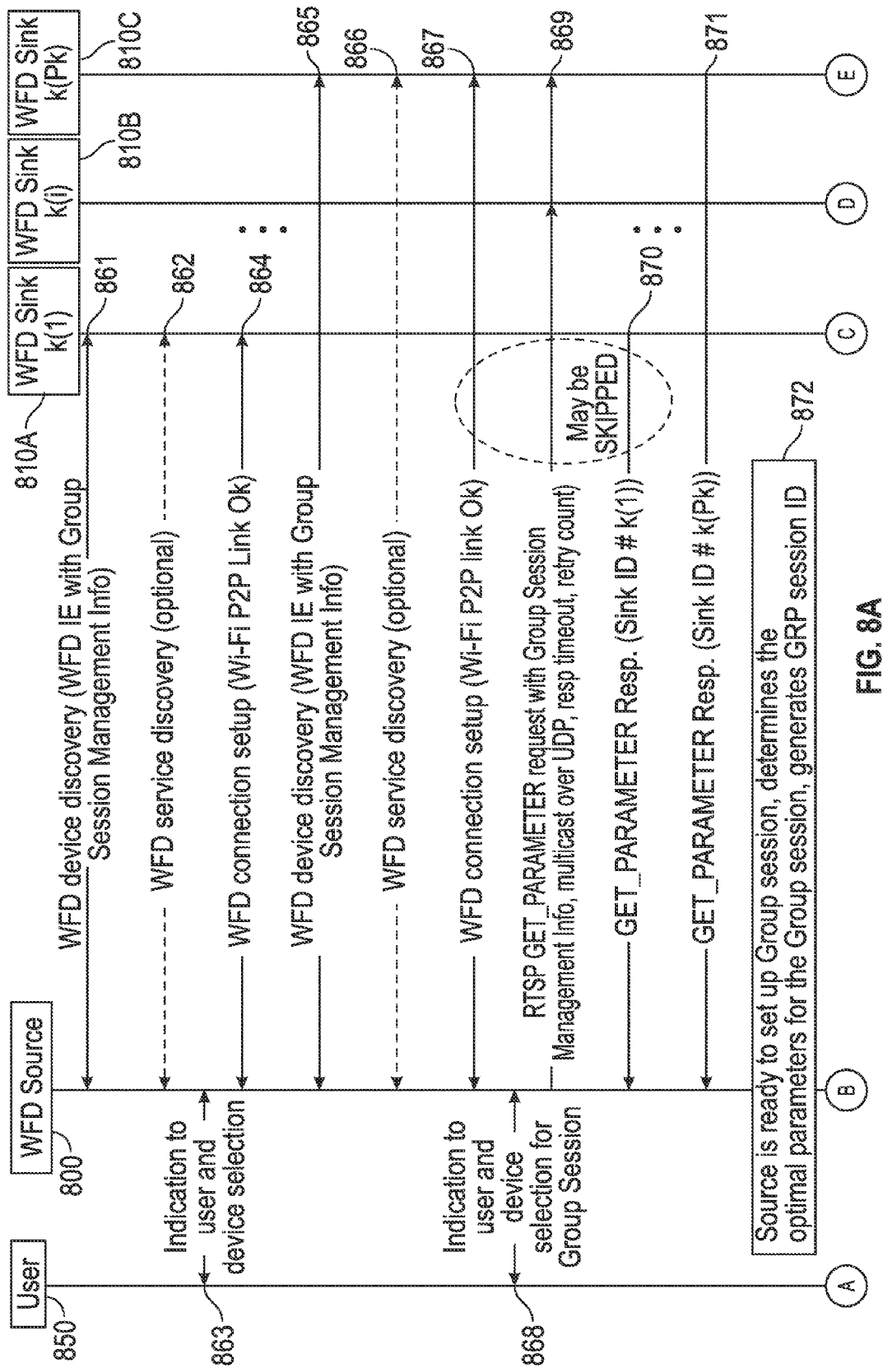
FIG. 8A illustrates another example implementation of a source-centric RTSP-based group session establishment and capability negotiation method between a Wi-Fi Display source device and a number of Wi-Fi Display sink devices and continues onto FIG. 8B.
Figure 8B:
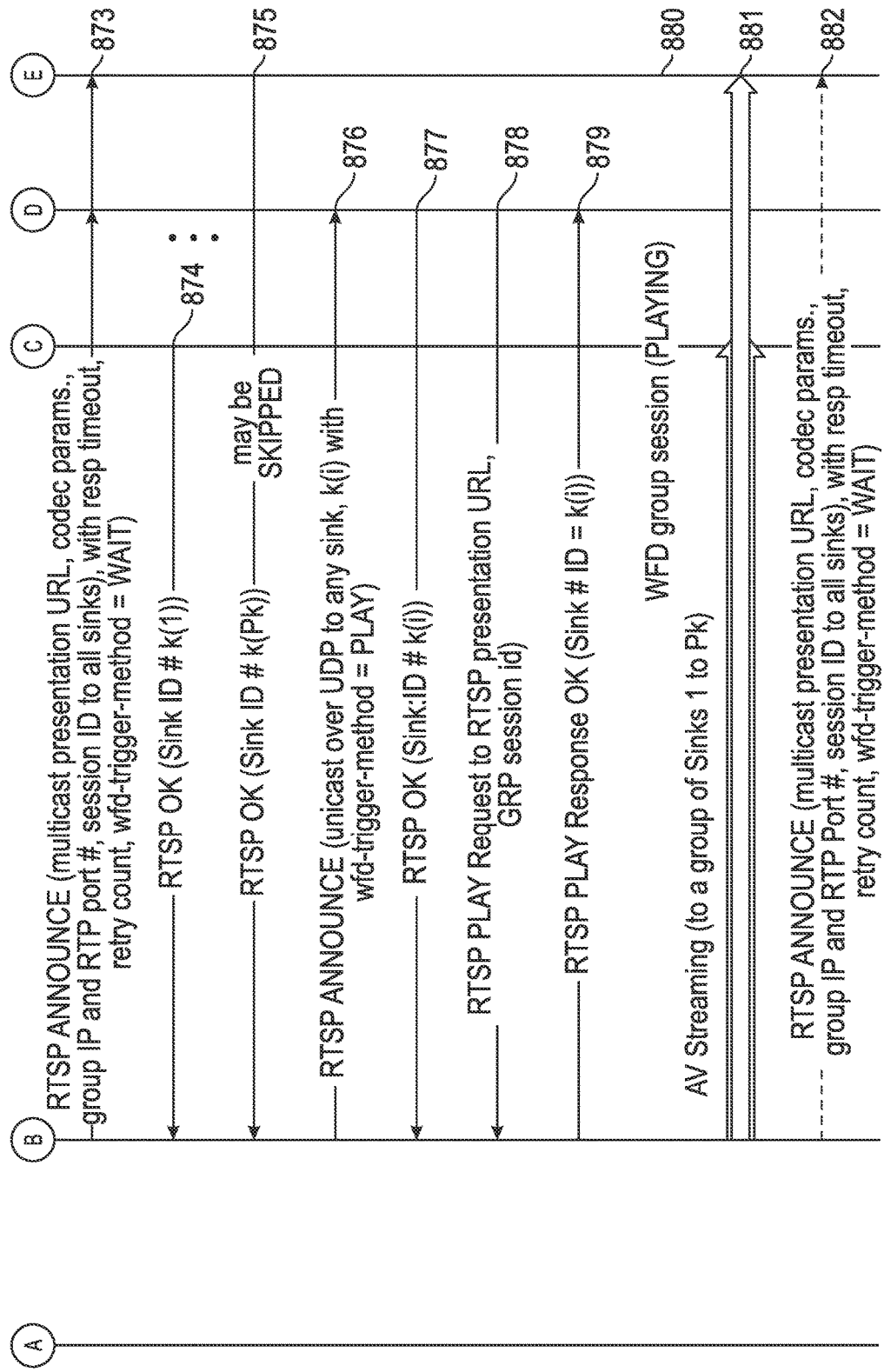
FIG. 8B further illustrates the example implementation of the source-centric RTSP-based group session establishment and capability negotiation method between the Wi-Fi Display source device and the number of Wi-Fi Display sink devices of FIG. 8A.

FIG. 8 (e.g., as illustrated by FIG. 8A and FIG. 8B taken as one continuing figure) illustrates another example implementation of a source-centric RTSP-based group session establishment and capability negotiation method between a Wi-Fi Display source device and a number of Wi-Fi Display sink devices. In the illustrated example, all of the sink devices are assumed to be in the same group. This method, as compared to the TCP-based methods of FIGS. 6 and 7, is a UDP-based "RTSPU" scheme for establishing a Wi-Fi Display group session more efficiently, which may use multiple retry functionality and opportunities for feedback (e.g., to maintain reliability).

At step 861, a Wi-Fi Display source 800 initiates a discovery phase with at least one of a Wi-Fi Display sink 810 (in this example, with a sink 810A). Discovery information exchanged during the discovery phase may include group session management information, as described above with respect to FIG. 5. In one implementation, the source 800 may use the discovery information to predetermine a set of multimedia formats and parameters so that it may skip certain capability exchange steps below (e.g., steps 869, 870, and/or 871). The discovery phase may occur on a chosen channel (e.g., channel 1, 6, or 11), based on the amount of traffic on the channel. Further, the discovery information may be exchanged between the source 800 and sinks 810 via probe request and probe response frames.

At step 862, one or more of the sinks 810 may also exchange service discovery information with the source 800. In one implementation, the source 800 may use the service discovery information to predetermine a set of multimedia formats and parameters so that it may skip certain capability exchange steps below (e.g., steps 869, 870, and/or 871).

At step 863, the source 800 may indicate to a user 850 that steps 861 and 862 have occurred and notify the user 850 of which sink or sinks 810 have been selected during the discovery phase (in this example, sink 810A has been selected).

At step 864, the source 800 may complete a connection setup with the sink or sinks 810 selected during the discovery phase. In some cases, the connection setup may be a Wi-Fi peer-to-peer link.

At step 865, the source 800 may initiate a continuing discovery phase with additional sinks 810 (in this example, with a sink 810B and 810C). Discovery information exchanged during the discovery phase may include group session management and device capability information. The exchange of information during the continuing discovery phase may occur one sink at a time, for example, the source 800 may exchange discovery information with the sink 810B and then exchange discovery information with the sink 810C. In one implementation, the source 800 may use the discovery information to predetermine a set of multimedia formats and parameters so that it may skip certain capability exchange steps below (e.g., steps 869, 870, and/or 871).

At step 866, one or more of the additional sinks 810 (here, 810B and 810C) may also exchange service discovery information from the source 800. In one implementation, the source 800 may use the service discovery information to predetermine a set of multimedia formats and parameters so that it may skip certain capability exchange steps below (e.g., steps 869, 870, and/or 871).

At step 867, the source 800 may complete a connection setup with the additional sinks 810 selected during the continuing discovery phase. In some cases, the connection setup may be a Wi-Fi peer-to-peer link.

At step 868, the source 800 may indicate to the user 850 that steps 865-867 have occurred and notify the user 850 of the number of sinks 810 that are present and meet the capability requirements (here, the sinks 810A, 810B, and 810C) have been selected during the discovery phases. In one implementation, if the source 800 has predetermined the set of multimedia formats and parameters necessary to skip capability exchanges, then the source 800 or the user 850 may choose to skip steps 869, 870, and 871 at this time.

At step 869, unless skipped as indicated above, the source 800 may send a request for capability information between itself and the sink or sinks 810 selected during the discovery phases in steps 861-867. The capability information may include, among other things, a multimedia codec, a multimedia format, a minimum latency or buffer capability, or supported multicast mechanisms (e.g., DMS or GCR). The source 800 may use an RTSP GET_PARAMETER command along with the group session management information to exchange and set the capability information. In one implementation, the source 800 may specify a timeout for response from a sink 810, as described in regards to FIG. 5. The source 800 may base the timeout for response on an expected network roundtrip time (e.g., the roundtrip time may be 50 ms to 500 ms for Wi-Fi channel access). Each UDP-based RTSP message request sent from the source 800 may include a "response time limit," "number of retries," and "next transmit interval," based on, at least, the timeout for response. Each of the UDP-based RTSP message requests may also include a unique sequence number (e.g., a CSeq header) to improve message reliability and clarity.

At steps 870 and 871, unless skipped as indicated above, the source 800 may retrieve the sink parameters (e.g., capability information) requested from the sink or sinks 810 in step 869. The exchange of information during this phase may occur one sink at a time, for example, the source 800 may exchange capability information with the sink 810A (as in step 870) and then exchange capability information with the sink 810B or 810C (as in step 871).

At step 872, the source 800 may be ready to establish a group session. In its establishment of the group session, the source 800 may determine the optimal parameters for the group session based on the capability information exchange between the sink or sinks selected in the above steps. The source 800 may also generate a group session ID at this time.

At step 873, the source 800 may enter an announcement phase during which it may send an announcement of the RTSP group session information to the connected sinks 810 (e.g., here, the sinks 810A, 810B, and 810C). The source 800 may use an RTSP ANNOUNCE command to send the announcement. The announcement may include, among other things, information regarding a multicast presentation URL, codec parameters, a group IP address, an RTP port number, and a common session ID for all of the sinks in the group session. During the announcement phase, the source 800 may operate under the WFD-TRIGGER-METHOD=WAIT command, during which it will wait to play a multimedia content. The announcement may also follow the response timeout and retry count parameters if established in step 869. If so, then the source 800 may set "only wait" for a predetermined waiting time for the response from one or more sinks before proceeding to transmit the next message. Further, because multicast over UDP may reduce protocol handling loads, the RTSP multicast presentation URL in the announcement may have the format "rtspu://<host [":" port] [path]." As further described below, the source 800 may continue to transmit the announcement to solicit new sinks to join the group session. The announcement may be repeated periodically at a predetermined time interval. The repeated announcement may occur even after the multimedia streaming has begun (in step 880), as described further in step 882.

At step 874, the sink 810 (here, the sink 810A) may send an RTSP OK message to the source 800, indicating that it has received the announcement of step 873.

At step 875, the additional sinks 810 (here, the sink 810C) may send an RTSP OK message to the source 800, indicating that they has received the announcement of step 873. In some implementations, this step may be skipped due to timeouts and retries as described above.

At step 876, as described above in regards to step 873, the source 800 may continue to transmit the announcement to solicit new sinks to join the group session. The announcement may be repeated periodically at a predetermined time interval. The repeated announcement may occur even after the multimedia streaming has begun (in step 880), as described further in step 882. In some implementations, the announcement sent at this stage in the method may be sent via unicast over UDP. During this announcement phase, the source 800 may operate under the WFD-TRIGGER-METHOD=PLAY command, during which the source 800 may be ready to play the multimedia content to the connected sinks 810 (here, the sinks 810A, 810B, and 810C).

At step 877, any additional sinks 810 (here, the sink 810B) may send an RTSP OK message to the source 800, indicating that they has received the announcement of step 876.

At step 878, one or more of the connected sinks 810 may send a play request (e.g., an RTSP PLAY request) to the source 800 via the RTSP presentation URL. The play request may be sent in accordance with the group session ID.

At step 879, in response to the play request of step 879, the source 800 may notify the requesting sinks 810 that playing will begin, e.g., via a "PLAY response OK" message.

At step 880, the source 800 may begin streaming the multimedia content over the group session to the requesting sinks 810. During this time, the source 800 may indicate a status of "PLAYING."

At step 881, the requesting sinks 810 may receive the streaming multimedia content from the source 800.

At step 882, as described above in regards to step 873, the source 800 may continue to transmit the announcement to solicit new sinks to join the group session. The announcement may be repeated periodically at a predetermined time interval. In some implementations, the announcement sent at this stage in the method may be sent via the multicast presentation URL. During the announcement phase, the source 800 may operate under the WFD-TRIGGER-METHOD=WAIT command, after which the receiving sink device may be ready to receive the content at any time.

Figure 9A:
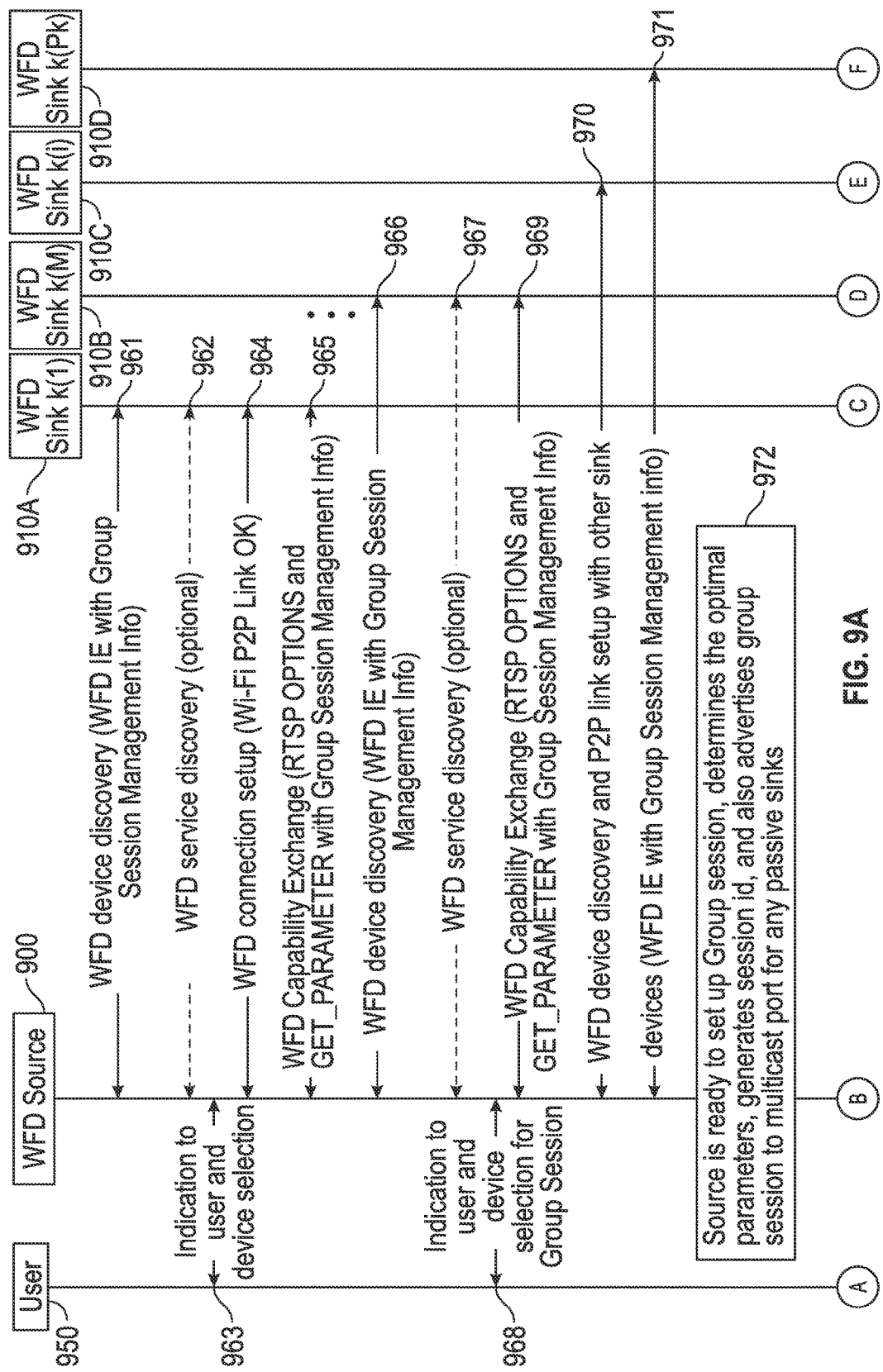
FIG. 9A illustrates another example implementation of a source-centric RTSP-based group session establishment and capability negotiation method between a Wi-Fi Display source device and a number of Wi-Fi Display sink devices and continues onto FIG. 9B.
Figure 9B:
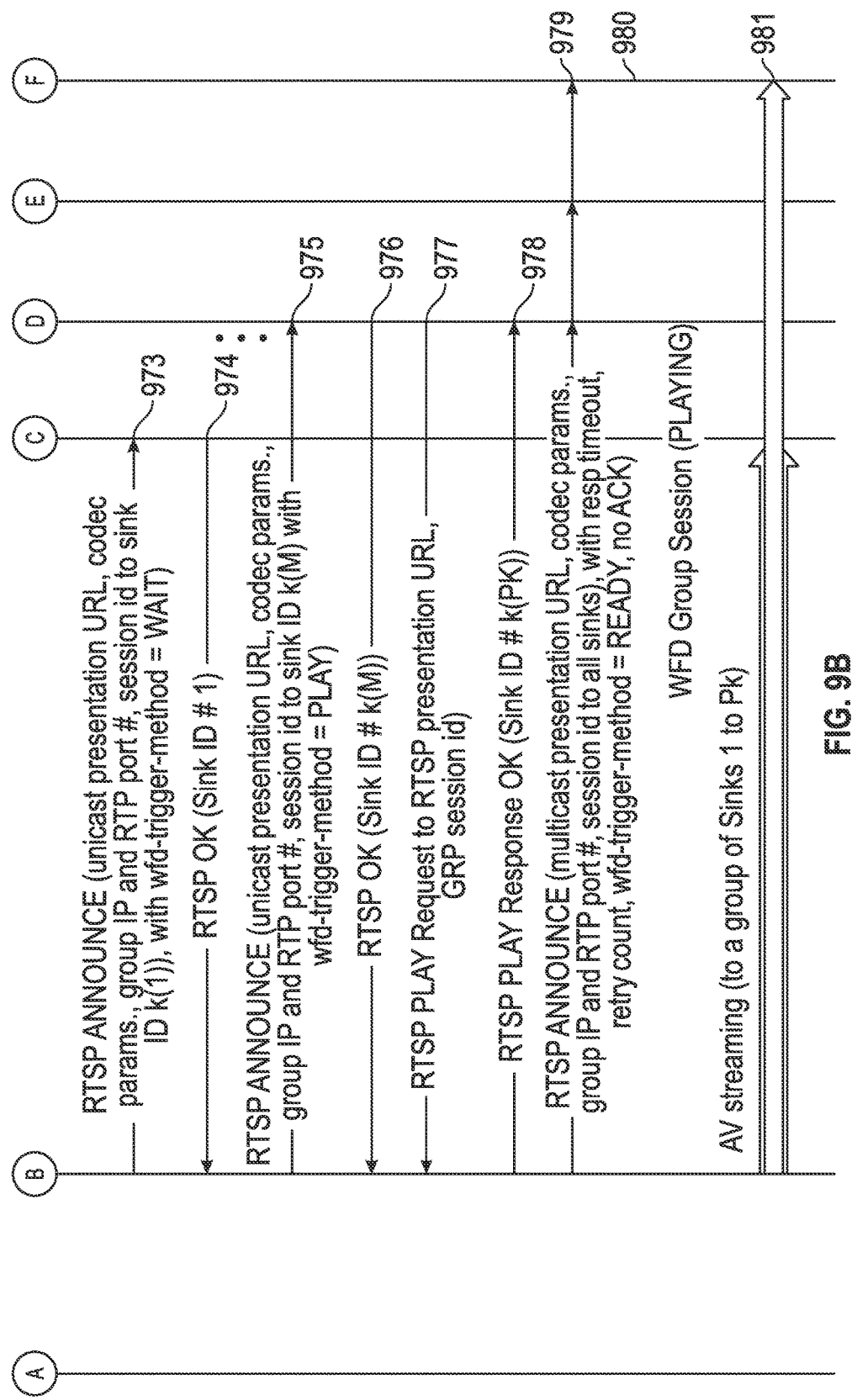
FIG. 9B further illustrates the example implementation of the source-centric RTSP-based group session establishment and capability negotiation method between the Wi-Fi Display source device and the number of Wi-Fi Display sink devices of FIG. 9A.

FIG. 9 (e.g., as illustrated by FIG. 9A and FIG. 9B taken as one continuing figure) illustrates another example implementation of a source-centric RTSP-based group session establishment and capability negotiation method between a Wi-Fi Display source device and a number of Wi-Fi Display sink devices. In the illustrated example, all of the sink devices are assumed to be in the same group. This method, as compared to the exclusively TCP-based methods of FIGS. 6 and 7, and as compared to the exclusively UDP-based method of FIG. 8, utilizes a hybrid of both the TCP-based RTSP messaging and the UDP-based RTSPU messaging schemes. As further described below (in regards to steps 973, 975, and 979), the source maintains a TCP-based RTSP connection to a limited number of "active" sink devices. The source also establishes a UDP-based RTSP messaging scheme for advertising the group session to any other "passive" sink devices eligible to join the group.

At step 961, a Wi-Fi Display source 900 initiates a discovery phase with at least one of a Wi-Fi Display sink 910 (in this example, with a sink 910A). Discovery information exchanged during the discovery phase may include group session management and device capability information, as described above with respect to FIG. 5. The discovery phase may occur on a chosen channel (e.g., channel 1, 6, or 11), based on the amount of traffic on the channel. Further, the discovery information may be exchanged between the source 900 and sinks 910 via probe request and probe response frames.

At step 962, one or more of the sinks 910 may also exchange service discovery information with the source 900.

At step 963, the source 900 may indicate to a user 950 that steps 961 and 962 have occurred and notify the user 950 of which sink or sinks 910 have been discovered during the discovery phase (in this example, sink 910A has been selected).

At step 964, the source 900 may complete a connection setup with the sink or sinks 910 selected during the discovery phase. In some cases, the connection setup may be a Wi-Fi peer-to-peer link.

At step 965, the source 900 may exchange a capability information between itself and the sink or sinks 910 selected during the discovery phase. Such capability information may include, among other things, a multimedia codec, a multimedia format, a minimum latency or buffer capability, or supported multicast mechanisms (e.g., DMS or GCR). The source 900 may use RTSP OPTIONS and GET_PARAMETER commands along with the group session management information to exchange and set the capability information.

At step 966, the source 900 may initiate a continuing discovery phase with additional sinks 910 (in this example, with a sink 910B). Discovery information exchanged during the discovery phase may include group session management and device capability information.

At step 967, one or more of the connected sinks 910 (here, 910A and 910B) may also exchange service discovery information from the source 900.

At step 968, the source 900 may indicate to the user 950 that steps 965-967 have occurred and notify the user 950 of the number of sinks 910 that are present and meet the capability requirements (here, the sinks 910A and 910B) have been selected during the discovery phases.

At step 969, the source 900 may again exchange capability information between itself and additional sinks 910 (here, the sink 910B) selected during the continuing discovery phase. Such capability information may include, among other things, a multimedia codec, a multimedia format, a minimum latency or buffer capability, or supported multicast mechanisms (e.g., DMS or GCR). The source 900 may use RTSP OPTIONS and GET_PARAMETER commands along with the group session management information to exchange and set the capability information.

At steps 970 and 971, the source 900 may initiate a second continuing discovery phase with additional sinks 910 (in this example, with a sink 910C and a sink 910D). Discovery information exchanged during the discovery phase may include group session management and device capability information. The exchange of information during the continuing discovery phase may occur one sink at a time, for example, the source 900 may exchange discovery information with the sink 910C (as in step 970) and then exchange discovery information with the sink 910D (as in step 971).

At step 972, the source 900 may be ready to establish a group session. In its establishment of the group session, the source 900 may determine the optimal parameters for the group session based on the capability information exchange between the sink or sinks selected in the above steps. The source 900 may also generate a group session ID at this time. Further, the source 900 may advertise its group session ID via a UDP-based multicast port such that "passive" sink devices (here, the sinks 910C and 910D) may join the group. The number of active and passive sinks may be predetermined or based on calculations of the source 900. In one embodiment, the number of active sink devices will be lower than the number of passive sink devices, because the active sink devices require more of the source 900 computing resources. As described above, the source 900 may maintain a TCP-based RTSP connection to the limited number of active sink devices (here, the sinks 910A and 910B) so that the source 900 may maintain reliable RTSP control over the limited number of active sink devices.

At steps 973 and 975, the source 900 may enter a unicast announcement phase during which it may send an announcement of the RTSP group session information to the active sinks 910 (here, the sinks 910A and 910B). The source 900 may use an RTSP ANNOUNCE command to send the announcement to the active sinks. The announcement may include, among other things, information regarding a presentation URL, codec parameters, a group IP address, an RTP port number, and a session ID for individual active sinks in the group session. In some implementations, the source 900 may send the announcement to active sinks one at a time. For example, as in step 973, the source 900 may send the announcement to the active sink 910A, and during this time, the source 900 may operate under the WFD-TRIGGER-METHOD=WAIT command, during which it will wait to play a multimedia content. Later, as in step 975, the source 900 may send the announcement to the active sink 910B, and during this time, the source 900 may operate under the WFD-TRIGGER-METHOD=PLAY command, during which the source 900 may be ready to play the multimedia content to the active sinks 910. The announcement may also follow the response timeout and retry count parameters as described above in regards to FIG. 8 step 869.

At steps 974 and 976, the active sinks 910 that have received the announcement of steps 973 or 975, respectively, (here, the sinks 910A and 910B, respectively) may send an RTSP OK message to the source 900, indicating that they have received the announcement of steps 973 and 975, respectively.

At step 977, one or more of the active sinks 910 may send a play request (e.g., an RTSP PLAY request) to the source 900 via the RTSP presentation URL. The play request may be sent in accordance with the group session ID.

At step 978, in response to the play request of step 977, the source 900 may notify the requesting active sinks 910 that playing will begin, e.g., via a "PLAY response OK" message.

At step 979, as described above in regards to steps 972, 973, and 975, the source 900 may continue to transmit the UDP-based RTSPU multicast announcement to solicit new passive sinks to join the group session. During this announcement phase, the source 900 may operate under the WFD-TRIGGER-METHOD=READY command, during which the source 900 may be ready to play the multimedia content to any passive sinks 910 (here, the sinks 910C and 910D) that may join the group. In one implementation, the source 900 may not request or receive an ACK response from any of the passive sinks. For example, the source 900 may not track the passive sink devices. Instead, the source 900 may only send multimedia codec parameters and other important group session streaming changes within the UDP-based announcement, whether passive sinks solicit the information or not. In one implementation, the capability exchange and session advertisement occurring within the UDP-based RTSPU multicast announcement may be performed by Layer 2 by using Wi-Fi Display action frames or service discovery procedures. If the passive sink devices support the Wi-Fi Display Service Discovery (WFDS) protocol, they may use the Application Service Platform (ASP) session to obtain the group session capabilities from the source 900 after the peer-to-peer discovery and connection have been established.

At step 980, the source 900 may begin streaming the multimedia content over the group session to any connected active and passive sinks 910 (here, the sinks 910A, 910B, 910C, and 910D). During this time, the source 900 may indicate a status of "PLAYING."

At step 981, the connected active and passive sinks 910 may receive the streaming multimedia content from the source 900.

Figure 10A:
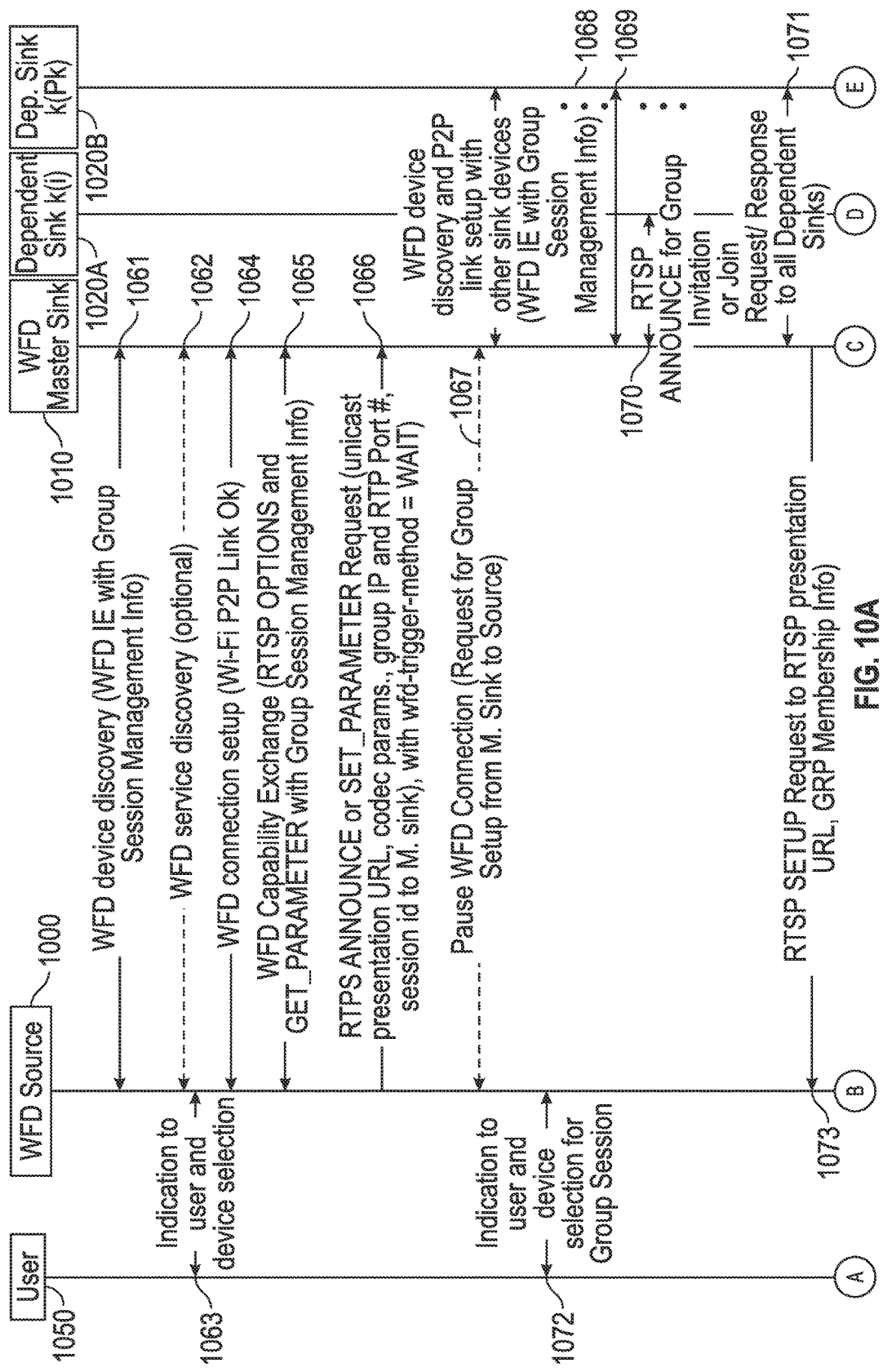
FIG. 10A illustrates an example implementation of a sink-centric RTSP-based group session management method between a Wi-Fi Display source device, a Wi-Fi Display master sink device, and a number of dependent sink devices and continues onto FIG. 10B.
Figure 10B:
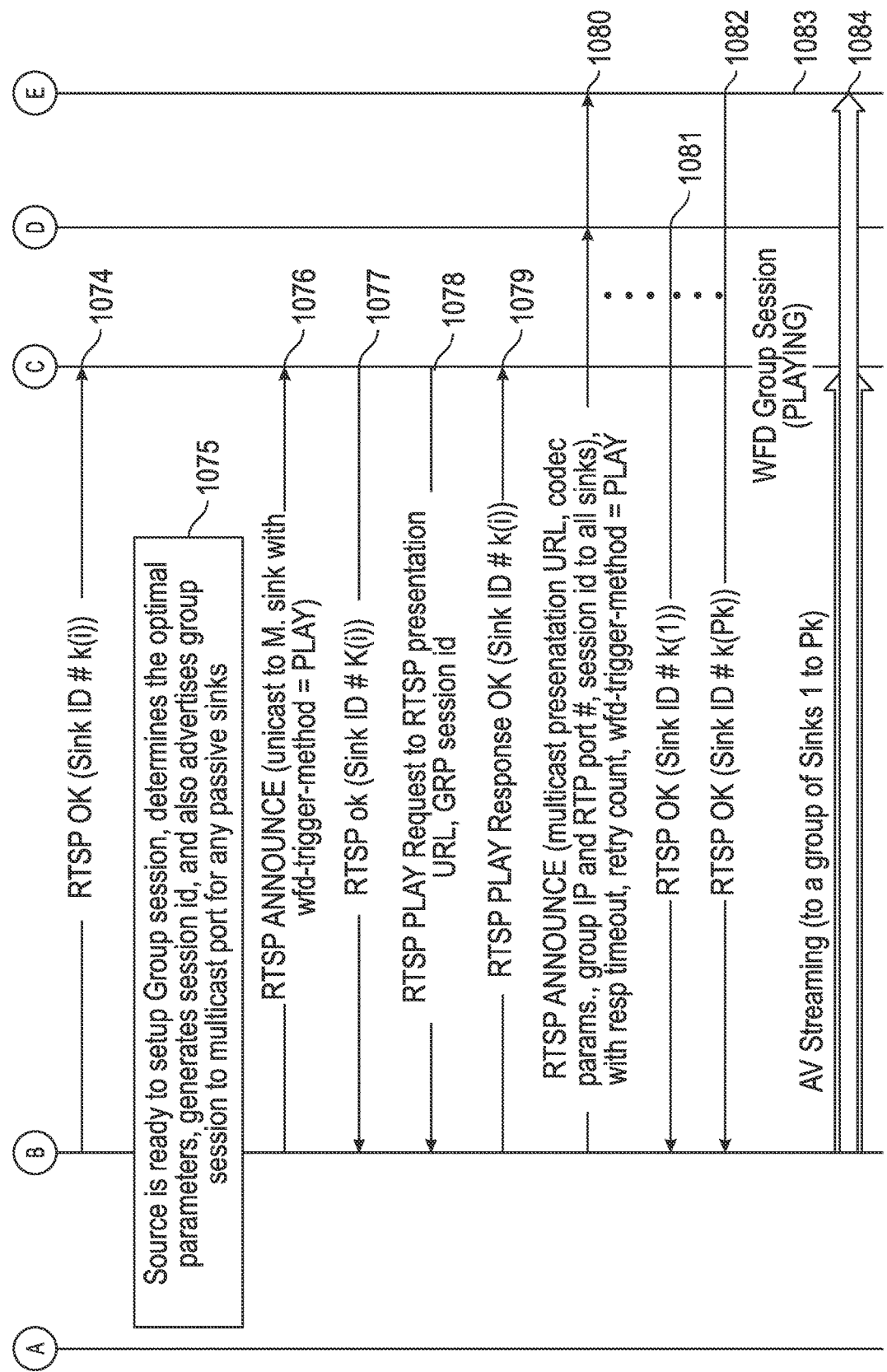
FIG. 10B further illustrates the example implementation of the sink-centric RTSP-based group session management method between the Wi-Fi Display source device, the Wi-Fi Display master sink device, and the number of dependent sink devices of FIG. 10A.

FIG. 10 (e.g., as illustrated by FIG. 10A and FIG. 10B taken as one continuing figure) illustrates an example implementation of a sink-centric RTSP-based group session management method between a Wi-Fi Display source device, a Wi-Fi Display master sink device, and a number of dependent sink devices. Contrary to FIGS. 6-9, where the source initiated a group session with individual sinks or groups of sinks, in this method, one "master" sink initiates a group session with a source and then invites other "dependent" sinks to the group session.

At step 1061, a Wi-Fi Display master sink 1010 initiates a discovery phase with a Wi-Fi Display source 1000. Discovery information exchanged during the discovery phase may include group session management information and device capability information, as described above with respect to FIG. 5. The discovery phase may occur on a chosen channel (e.g., channel 1, 6, or 11), based on the amount of traffic on the channel. Further, the discovery information may be exchanged between the source 1000 and the master sink 1010 via probe request and probe response frames.

At step 1062, the master sink 1010 may also exchange service discovery information with the source 1000.

At step 1063, the source 1000 may indicate to a user 1050 that steps 1061 and 1062 have occurred and notify the user 1050 that the master sink 1010 has been connected.

At step 1064, the source 1000 and the master sink 1010 may complete a connection setup. In some cases, the connection setup may be a Wi-Fi peer-to-peer link.

At step 1065, the source 1000 and the master sink 1010 may exchange a capability information using TCP-based RTSP message exchange. Such capability information may include, among other things, a multimedia codec, a multimedia format, a minimum latency or buffer capability, or supported multicast mechanisms (e.g., DMS or GCR). The source 1000 may use RTSP OPTIONS and GET_PARAMETER commands along with the group session management information to exchange and set the capability information. In one implementation, the source 1000 may notify the master sink 1010 that it intends to serve a group of sink devices as a "Sink Centric" group. In this case, also during the capability exchange phase, the master sink 1010 may respond and take on the role of the master sink (or "control sink").

At step 1066, the source 1000 may send a unicast RTSP announcement or a parameter request to the master sink 1010. The source 1000 may use an RTSP ANNOUNCE command to send the announcement or a SET PARAMETER command to send the parameter request. The announcement may include, among other things, information regarding a presentation URL, codec parameters, a group IP address, an RTP port number, and a session ID for the master sink. During this time, the source 1000 may operate under the WFD-TRIGGER-METHOD=WAIT command, during which it will wait to play a multimedia content. In some implementations, when the support of a large number of sink devices in the group session is required, the source 1000 may use the RTSPU scheme (IETF RFC 2326) over UDP for managing the group session streaming control, e.g., using the ANNOUNCE method.

At step 1067, the source 1000 and the master sink 1010 may temporarily stop communication (e.g., pause) when the master sink 1010 sends the source 1000 a request for a group setup and then proceeds to step 1068.

At steps 1068 and 1069, the master sink 1010 may initiate a continuing discovery phase with dependent sinks 1020 (in this example, with a dependent sink 1020A and a dependent sink 1020B). Discovery information exchanged during the discovery phase may include group session management information and device capability information. The master sink 1010 may send group invitation messages to the dependent sinks 1020 via peer-to-peer or service discovery. The group invitation messages may include the multimedia format used for the multimedia streaming in the current Wi-Fi Display group session. The group invitation messages may also include the IP address and port number for the RTP/UDP packets that the sink devices may receive from the source 1000. The exchange of information during the continuing discovery phase may occur one sink at a time, for example, the master sink 1010 may exchange discovery information with the dependent sink 1020A (as in step 1068) and then exchange discovery information with the dependent sink 1020B (as in step 1069). During this time, the master sink 1010 may also establish coupling to the group of dependent sinks and/or gather information about them. In some implementations, when the support of a large number of sink devices in the group session is required, the master sink 1010 may use the RTSPU scheme (IETF RFC 2326) over UDP for managing the group session streaming control, e.g., using the ANNOUNCE method.

At steps 1070 and 1071, the master sink 1010 may send an RTSP announcement to the dependent sinks 1020 (here, dependent sinks 1020A and 1020B). The announcement may include an invitation for the dependent sinks 1020 to join the group session or to join a request/response process. The announcement may be sent to one dependent sink at a time, for example, the master sink 1010 may send the announcement to the dependent sink 1020A (as in step 1070) and then send the announcement to the dependent sink 1020B (as in step 1071).

At step 1072, the source 1000 may indicate to the user 1050 that steps 1064-1071 have occurred and allow the user 1050 to make a device selection for the group session.

At step 1073, the master sink 1010 may send an RTSP setup request via the RTSP presentation URL to the source 700. The RTSP setup request may include the group session membership information, e.g., the number and identifications of the dependent sinks.

At step 1074, the source 1000 may send an RTSP OK message to the master sink 1010 indicating that it has received and approved the request of step 1073.

At step 1075, the source 1000 may be ready to establish a group session. In its establishment of the group session, the source 1000 may determine the optimal parameters for the group session. The source 1000 may also generate a group session ID at this time. Further, the source 1000 may advertise its group session ID via a UDP-based multicast port such that passive sink devices (here, the dependent sinks 1020A and 1020B) may join the group. This process is further described with respect to FIG. 9.

At step 1076, the source 1000 may enter a unicast announcement phase during which it may send an announcement of the RTSP group session information to the master sink 1010. The source 1000 may use an RTSP ANNOUNCE command to send the announcement to the master sink 1010. During this time, the source 1000 may operate under the WFD-TRIGGER-METHOD=PLAY command, during which the source 1000 may be ready to play the multimedia content to the master sink 1010. In some implementations, when the support of a large number of sink devices in the group session is required, the source 1000 may use the RTSPU scheme (IETF RFC 2326) over UDP for managing the group session streaming control, e.g., using the ANNOUNCE method.

At step 1077, the master sink 1010 may send an RTSP OK message to the source 1000, indicating that it received the announcement of step 1076.

At step 1078, the master sink 1010 may send a play request (e.g., an RTSP PLAY request) to the source 1000 via the RTSP presentation URL. The play request may be sent in accordance with the group session ID.

At step 1079, in response to the play request of step 1078, the source 1000 may notify the master sink 1010 that playing will begin, e.g., via a "PLAY response OK" message.

At step 1080, the source 1000 may continue to transmit the UDP-based RTSPU multicast announcement (as described in step 1075) to solicit new passive sinks (e.g., the dependent sinks 1020A and 1020B) to join the group session. During this time, the source 1000 may operate under the WFD-TRIGGER-METHOD=PLAY command, during which the source 1000 may be ready to play the multimedia content to any passive sinks 1010 (here, the sinks 1020A and 1020B) that may join the group. The announcement may include, among other things, information regarding a multicast presentation URL, codec parameters, a group IP address, an RTP port number, and a common session ID for all of the sinks in the group session. The announcement may also follow the response timeout and retry count parameters as described in regards to FIG. 8. In some implementations, when the support of a large number of sink devices in the group session is required, the source 1000 may use the RTSPU scheme (IETF RFC 2326) over UDP for managing the group session streaming control, e.g., using the ANNOUNCE method.

Following the announcement of step 1080, any other sink device may send a request to join the group to the master sink 1010 after this time. If the requesting sink device meets the required parameters (as determined by the group session), then the master sink 1010 may send the requesting sink device an affirmative response and send an invitation to join the group to the requesting sink device. If the requesting sink device accepts the invitation, it may send sink information to the source 1000. The source 1000 may then update the group session parameter information and begin streaming the multimedia content to the multicast UDP-based port. The source 1000 may also begin streaming the multimedia content to any other MAC layer data delivery for the group of users. In some implementations, the source 1000 may advertise its intent to be a group owner when multicast data delivery is required by the MAC layer for multicast traffic, e.g., 802.11 DMS or GCR procedures.

At steps 1081 and 1082, the dependent sinks 1020 that have received the announcement of step 1080 (here, the sinks 1010A and 1010B, respectively) may send an RTSP OK message to the source 1000, indicating that they have received the announcement. The RTSP OK message may be received from one dependent sink at a time, for example, the dependent sink 1020A may send the RTSP OK message to the source 1000 (as in step 1081) and then the dependent sink 1020B may send the RTSP OK message to the source 1000 (as in step 1082).

At step 1083, the source 1000 may begin streaming the multimedia content over the group session to the master sink 1010 and any connected dependent sinks 1010 (here, the dependent sinks 1020A and 1020B). During this time, the source 1000 may indicate a status of "PLAYING."

At step 1084, the connected sinks may receive the streaming multimedia content from the source 1000. The master sink 1010 may manage the streaming control features, e.g., Play, Pause, or other user inputs. To enable this control by the user 1050, the master sink 1010 may have user input back channel (UIBC) capability over its TCP connection.

FIG. 11 (e.g., as illustrated by FIG. 11A and FIG. 11B taken as one continuing figure) illustrates an example subelement content layout for Wi-Fi Display group session management information. The subelement may be included within the Wi-Fi Display information element with the purpose of a source or sink advertising group session information (such as the group session discussed in regards to FIGS. 4-10) for device discovery (e.g., discovering a number of sink devices). The subelement may include the minimum amount of information that the devices should exchange during device discovery.

The devices participating in the process may include the peer-to-peer Wi-Fi Display group service devices as described in regards to FIGS. 4-10, e.g., the group session capable source, the group session capable master sink and other sink devices. One or more of the devices may include the illustrated subelement, which may indicate, among other things, a capability for the group session, a type of the group session, a group session management port information, and a support (if any) for group addressed frames by a MAC layer for delivery of multicast packets, as described more fully in regards to rows 1140, 1160, and 1180 below. In the case that the source has more than one group sessions at once, the source may include one multiple group session management info subelement for each group.

In one implementation, the source or the sink devices may support the service discovery procedures from the Wi-Fi Direct Services Standard, and the subelement information may be included as a display capability parameter for service discovery (e.g., included in the service_information_request for Display SeekService). The table in FIG. 11 illustrates an example of this implementation.

The example subelement may include a number of fields. The field column 1100 lists the example fields. Some fields may have suggested octet sizes, which are listed in the size column 1102. In the case that the field has a suggested value, it is listed in the value column 1104. The description column 1106 provides a brief summary of each field, which will be discussed in further detail below.

As illustrated in row 1110, the subelement may include a "Subelement ID" field with a 1-octet size and a predetermined value. The Subelement ID field may identify the corresponding type of Wi-Fi Display subelement.

As illustrated in row 1120, the subelement may also include a "Length" field with a 2-octet size and a value of '6'. The Length field may indicate the length of any subsequent fields in the subelement.

As illustrated in row 1130, the subelement may also include a "WFD Group Session Identifier" field with a 4-octet size. The WFD Group Session Identifier field may include a unique group session identifier assigned by a source device (e.g., the source described in regards to FIGS.

4-10) during an RTSP session establishment for the group Wi-Fi Display session. In the case that the group session has yet to begin, the WFD Group Session Identifier field may have an all-zeroes value.

As illustrated in row 1140, the subelement may also include a "WFD Group Session Type" field with a 1-octet size. The WFD Group Session Type field may include a bitmap specifying the type of the group session. In some cases, the group session may be a source-centric type, as described in regards to FIGS. 4-9. In other cases, the group session may be a master-sink centric type, as described in regards to FIG. 10. The group session may also be of other types. The type of group session may be indicated in the first four bits of the bitmap. The bitmap may also indicate the type of RTSP protocol port managing the group session, e.g., TCP port, UDP port, or a hybrid (all as described in regards to FIGS. 4-10. The type of RTSP protocol port may be indicated in the last four bits of the bitmap.

As illustrated in row 1150, the subelement may also include a "Group Session Management Control Port Info" field with a 2-octet size. The Group Session Management Control Port Info field may include the TCP or UDP port at which the Wi-Fi Display device may listen for RTSP messages for a group session. The value of the Group Session Management Control Port Info may be any valid UDP or TCP port value.

As illustrated in row 1160, the subelement may also include a "Supported Group Multicast Methods" field with a 7-octet size. The Supported Group Multicast Methods field may include a bitmap indicating support for group addressed frame delivery by a MAC layer. Examples of support systems that may be set include DMS only, GCR (Group Code Recording) with block ACK, GCR with unsolicited retries, etc. The bitmap may also indicate that no group addressed delivery support will be implemented. The group addressed frame delivery support may be indicated in the first 8 bits of the bitmap. In the case of the bitmap setting GCR with block ACK or GCR with unsolicited retries, the next 6 bytes of the Supported Group Multicast Methods field may include the GCR group address. In the case of the bitmap setting a support system other than GCR with block ACK or GCR with unsolicited retries, then the GCR group address info subfield may be left reserved.

As illustrated in row 1170, the subelement may also include a "Mandatory Parameters for Group" field. The Mandatory Parameters for Group field may include information pertaining to the minimum required support for a common multimedia format, a latency or buffer capability information, and/or other parameters necessary for the source to stream multimedia content to one or more sinks. In some cases, the value of the Mandatory Parameters for Group field may be optional. In one implementation, the Source may require support for the minimum latency, buffer capabilities, and/or the common multimedia format of the content for streaming without transcoding indicated in the Mandatory Parameters for Group field. In the case that the source does not solicit individual sink capabilities (e.g., as in one implementation of the method described in regards to FIG. 8), or if the sink devices do not support the native format of the content, then the source or the sinks may re-encode and/or transcode the content to the mandatory multimedia format and parameters (e.g., a 1280×720p, 24 fps resolution) to be used for streaming during the group session.

As illustrated in row 1180, the subelement may also include a "WFD Group Member Info Descriptor" field with a 7-octet size, representing the sum of all of the group members (e.g., the number of group members). The WFD Group Member Info Descriptor field may indicate the type and status of each member device in its first octet. Examples of the type and status of the member devices may include the Master Sink, Regular Sink, Multicast Capable, Unicast-Only, etc. types as described in regards to FIGS. 4-10. The WFD Group Member Info Descriptor field may also include the MAC address or any other unique identifier of each device. The MAC address or unique identifier may be located in the last 6 octets of the WFD Group Member Info Descriptor field. In the case the WFD Group Member Info Descriptor field holding a single entry (e.g., 7 bytes), the MAC address field may contain all zeroes, and the first octet may indicate only the number of active devices or members in the group. In one implementation, the source and/or the master sink may update the WFD Group Member Info Descriptor field based on information related to the latest member device to join the group.

In some implementations, the subelement may also include additional fields (not pictured). Examples of additional fields may include fields pertaining to information regarding device categories (e.g., group session capable source, group service capable master sink, etc.) or the preferred mode for each device (e.g., peer-to-peer GO, soft-AP, no preference for a role, etc.).

Figure 12:
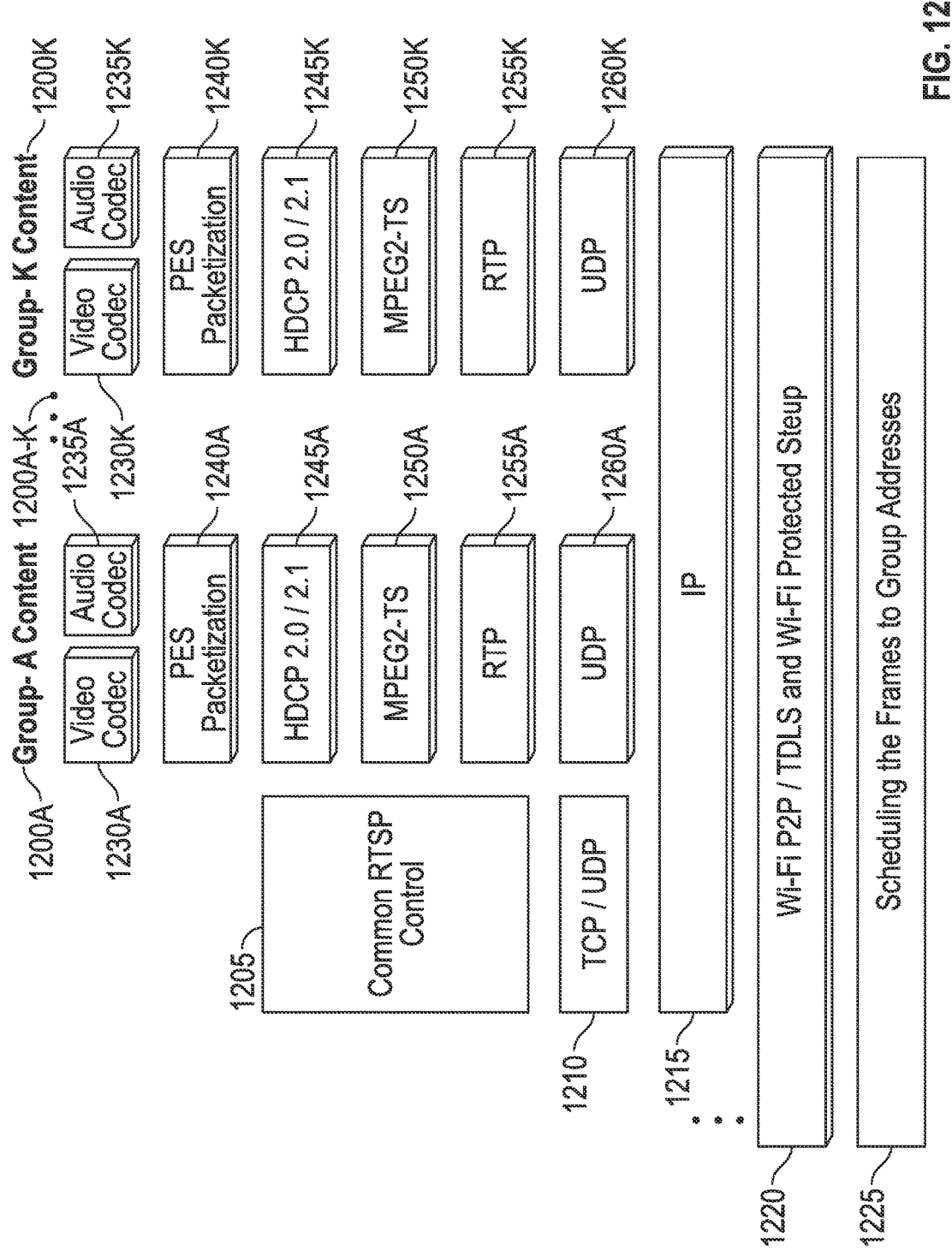
FIG. 12 illustrates an example of a data plane stack for delivering multimedia content for group sessions.

FIG. 12 illustrates an example of a data plane stack for delivering multimedia content for group sessions. In one embodiment, one instance of the data plane stack may be necessary to perform the content processing for each group session to be supported. Using the methods below, it may be possible to notify the data plane stack (i.e., by using the RTSP streaming control protocol) of the system MAC layer capabilities for handling frame delivery to a group of sink devices (e.g., the sink devices as described in regards to FIGS. 4-10). The data plane stack illustration in FIG. 12 includes several session groups and their content, such as a group-A content 1200A and a group-K content 1200K. Each group may include sinks that are all capable of receiving the same required multimedia format and/or of meeting a maximum latency requirement. The data plane stack also utilizes resources and control signaling not specific to one group, such as a Common RTSP Control 1205 and a TCP/UDP information 1210. The one or more data plane stacks may also use common components across the system and all groups, such as an IP socket 1215 and a Wi-Fi peer-to-peer/TLDS and Wi-Fi protected setup handling units 1220. The data plane dedicated to each of the sink groups may include individual components or resources, such as a video codec 1230, an audio codec 1235, a packetized elementary system (PES) information 1240, an HDCP 2.0/2.1 information 1245, an MPEG2-TS information 1250, an RTP information 1255, and a UDP information 1260. The data plane stack may schedule the frames to their respective group address as 1225.

For media content delivery within a group of sinks (e.g., the groups as displayed above in FIG. 12), the Directed Multicast Service (DMS) or the Group-Cast with Retries (GCR) procedures from 802.11aa may be used to ensure MAC layer reliability and robust multimedia streaming. The exact retransmission procedures for the DMS or GCR delivery methods may depend on, among other things, the capabilities of the source and sinks in the group, the number of devices in the group, channel conditions, bandwidth requirements, etc. Given varying conditions of these parameters, several options for multimedia delivery methods may be used. The source may announce the group session delivery method, based on the below examples, to be DMS only, Unsolicited GCR only, GCR with block ACK, both DMS and GCR, non-GCR, etc.

One example method for multimedia delivery may include a source transmitting with one MPEG2-TS and a RTP/UDP flow for the initial setup with sink devices. Subsequently, the source may use a multicast IP packet and convert to unicast MAC frames using DMS. This method offers the reliability of multiple unicast MAC transmissions.

Another example method for multimedia delivery includes GCR with unsolicited retries. In this method, the source may transmit the data frames to a GCR address, which may be advertised in the Wi-Fi Display information element (as described in regards to FIG. 11) and in the RTSP messages. The source may also retransmit individual data frames to ensure that they are received by the sink devices. In the case that the source retransmits frames, it may advertise its retransmission policy to the sink devices.

Another example method for multimedia delivery includes GCR with Block ACK. In this method, the data frames may be sent via multicast to the GCR address. Further, the source may send block-ACK request frames at the end of a block of MAC frames. The group of sink devices may then return the block ACK within a timeout period.

In the case that none of the above example methods for multimedia delivery methods are supported (e.g., due to limited capabilities of the source or sink devices), the group streaming may use a non-GCR multicast method. The non-GCR multicast method may not include ACK requests or retries. In this method, the source and/or a high number of the sink devices may not support any group-addressed frame delivery. The source may operate as a peer-to-peer GO or soft AP and may use regular multicast for transmitting the data frames after receiving a multicast IP packet from a UDP stack. The content bitstream may be generated by one instance of data plane stacks (e.g., codecs, PES, HDCP, MPEG2-TS/RTP/UDP, etc.), and the MAC layer may transmit these frames at specific instants as indicated in the delivery traffic indication message (DTIM). This method may result in low data rates for multicast frames and high packet loss. As a result, the RTSP keep-alive timeout may be set to ensure that the sinks are connected and that any other feedback mechanisms (e.g., RTSP) may also be used.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a means for selectively allowing current in response to a control voltage may comprise a first transistor. In addition, means for limiting an amount of the control voltage comprising means for selectively providing an open circuit may comprise a second transistor.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above may also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus configured as a source device to transmit multimedia content to a plurality of sink devices, comprising a processor configured to:
   connect the source device to the plurality of sink devices by making a first Wi-Fi peer-to-peer connection with a first sink device in a first group and a second Wi-Fi peer-to-peer connection with a second sink device in a second group;
   generate a first control message including a first group session ID and a first transport port number at the source device, the first transport port number to be used for communicating to the first group a particular multimedia content associated with the first group, the first group session ID being used by the source for autonomously initiating a group session with the first group;
   generate a second control message including a second group session ID and a second transport port number at the source device, the second transport port number to be used for communicating to the second group a particular multimedia content associated with the second group, the second group session ID being used by the source for autonomously initiating a group session with the second group;
   determine a set of streaming parameters for the Wi-Fi peer-to-peer connected sink devices associated with the first group session ID based on capabilities of the first group; and
   determine a set of streaming parameters for the Wi-Fi peer-to-peer connected sink devices associated with the second group session ID based on capabilities of the second group;
   a transmitter configured to:
   transmit to each of the Wi-Fi peer-to-peer connected sink devices in the first group the first control message;
   transmit to each of the Wi-Fi peer-to-peer connected sink devices in the second group the second control message;
   transmit, using the first transport port number and according to the set of streaming parameters associated with the first group, the particular multimedia content to the Wi-Fi peer-to-peer connected sink devices of the first group; and
   transmit, using the second transport port number and according to the set of streaming parameters associated with the second group, the particular multimedia content to the Wi-Fi peer-to-peer connected sink devices of the second group.

2. The apparatus of claim 1, wherein the set of streaming parameters includes one of a codec information, a display resolution, a video format, or an audio format or a combination thereof.

3. The apparatus of claim 1, wherein the first and second control messages each include one of a multicast configuration, a unicast configuration, or a groupcast configuration including a group MAC address for content streaming or a combination thereof.

4. The apparatus of claim 1, wherein the transmission of the particular multimedia content occurs by using a multicast frame delivery technique.

5. The apparatus of claim 4, wherein the multicast frame delivery technique is based on the acknowledgement and retry procedures of the 802.11aa standard.

6. The apparatus of claim 1, wherein the processor is further configured to:
   establish and maintain the group session with the first group over the Wi-Fi peer-to-peer connections; and
   establish a control messaging scheme for broadcasting the first group session ID, the first transport port information, and a set of steaming parameters to unconnected sink devices for allowing them to be associated with the first group session ID.

7. The apparatus of claim 1, wherein the processor is further configured to periodically broadcast the first group session ID, the first transport port information, and the set of steaming parameters at a predetermined time interval.

8. The apparatus of claim 1, wherein the processor is further configured to
   receive the capabilities from each of the Wi-Fi peer-to-peer connected sink devices of the first group and the second group requesting the particular multimedia content.

9. The apparatus of claim 1, wherein the processor is further configured to
   add or remove one or more of the Wi-Fi peer-to-peer connected sink devices from the associated group session ID based on one of a request initiated at the apparatus or a request initiated at the sink device; and
   add or remove one or more of the Wi-Fi peer-to-peer connected sink devices from the associated group session ID based on an insufficient capability of the sink device.

10. The apparatus of claim 9, wherein the insufficient capability of the sink device includes at least its inability to support a session type or an inability to support at least one of the streaming parameters to be used for content streaming.

11. The apparatus of claim 1, wherein at least one of the particular multimedia content, the group session ID, a session type, the transport port information, and the set of streaming parameters is different for the first and second groups of devices.

12. The apparatus of claim 1, wherein establishing the Wi-Fi peer-to-peer connection includes an exchange of a Wi-Fi Display device discovery information, wherein the Wi-Fi Display device discovery information comprises at least an indication of a group session capability of the apparatus, a set of group session management control port data, a group session type, and a set of streaming parameters to be used for content streaming.

13. The apparatus of claim 12, wherein at least a subset of the Wi-Fi Display device discovery information is further exchanged through an Application Service Platform of the Wi-Fi Direct Services standard over a pre-established Wi-Fi peer-to-peer connection.

14. A method of transmitting multimedia content to a plurality of sink devices, comprising:
   connecting a source device to the plurality of sink devices by making a first Wi-Fi peer-to-peer connection with a first sink device in a first group and a second Wi-Fi peer-to-peer connection with a second sink device in a second group;
   generating a first control message including a first group session ID and a first transport port number at the source device, the first transport port number to be used for communicating to the first group a particular multimedia content associated with the group, the first group session ID being used by the source for autonomously initiating a group session with the first group;

generating a second control message including a second group session ID and a second transport port number at the source device, the second transport port number to be used for communicating to the second group a particular multimedia content associated with the second group, the second group session ID being used by the source for autonomously initiating group session with the second group;

determining a set of streaming parameters for the Wi-Fi peer-to-peer connected sink devices associated with the first group session ID based on capabilities of the first group; and determining a set of streaming parameters for the Wi-Fi peer-to-peer connected sink devices associated with the second group session ID based on capabilities of the second group;

transmitting to each of the Wi-Fi peer-to-peer connected sink devices in the first group the first control message;

transmit to each of the Wi-Fi peer-to-peer connected sink devices in the second group the second control message;

transmitting, using the first transport port number and according to the set of streaming parameters associated with the first group, the particular multimedia content to the Wi-Fi peer-to-peer connected sink devices of the first group; and transmitting, using the second transport port number and according to the set of streaming parameters associated with the second group, the particular multimedia content to the Wi-Fi peer-to-peer connected sink devices of the second group.

15. The method of claim 14, further comprising:
establishing and maintaining the group session with the first group over the Wi-Fi peer-to-peer connections; and
establishing a control messaging scheme for broadcasting the first group session ID, the first transport port information, and a set of streaming parameters to unconnected sink devices for allowing them to be associated with the first group session ID.

16. The method of claim 14, further comprising
adding or removing one or more of the Wi-Fi peer-to-peer connected sink devices from the associated group session ID based on one of a request initiated at the source device or a request initiated at the sink device; and
adding or removing one or more of the Wi-Fi peer-to-peer connected sink devices from the associated group session ID based on an insufficient capability of the sink device, wherein the insufficient capability of the sink device includes at least its inability to support a session type or an inability to support at least one of the streaming parameters to be used for content streaming.

17. The method of claim 14, wherein at least one of the particular multimedia content, the group session ID, a session type, the transport port information, and the set of streaming parameters is different for the first and second groups of devices.

18. The method of claim 14, wherein establishing the Wi-Fi peer-to-peer connection includes an exchange of a Wi-Fi Display device discovery information, wherein the Wi-Fi Display device discovery information comprises at least an indication of a group session capability of the source device, a set of group session management control port data, a group session type, and a set of streaming parameters to be used for content streaming.

19. The method of claim 18, wherein at least a subset of the Wi-Fi Display device discovery information is further exchanged through an Application Service Platform of the Wi-Fi Direct Services standard over a pre-established Wi-Fi peer-to-peer connection.

20. An apparatus for transmitting as a sourced device multimedia content to a plurality of sink devices, comprising:
means for connecting the source device to the plurality of sink devices by making a first Wi-Fi peer-to-peer connection with a first sink device in a first group and a second Wi-Fi peer-to-peer connection with a second sink device in a second group;
means for generating a first control message including a first group session ID and a first transport port number at the source device, the first transport port number to be used for communicating to the first group a particular multimedia content associated with the group, the first group session ID being used by the source for autonomously initiating a group session with the first group;
means for generating a second control message including a second group session ID and a second transport port number at the source device, the second transport port number to be used for communication to the second group a articular multimedia content associated with the second group, the second group session ID being used by the source for autonomously initiating a group session with the second group;
means for determining a set of streaming parameters for the Wi-Fi peer-to-peer connected sink devices associated with the first group session ID based on capabilities of the first group; and
means for determining a set of streaming parameters for the Wi-Fi peer-to-peer connected sink devices associated with the second group session ID based on capabilities of the second group;
means for transmitting to each of the Wi-Fi peer-to-peer connected sink devices in the first group the first control message;
means for transmitting to each of the Wi-Fi peer-to-peer connected sink devices in the second group the second control message;
means for transmitting, using the first transport port number and according to the set of streaming parameters associated with the first group, the particular multimedia content to the Wi-Fi peer-to-peer connected sink devices of the first group; and
means for transmitting, using the first transport port number and according to the set of streaming parameters associated with the first group, the particular multimedia content to the Wi-Fi peer-to-peer connected sink devices of the first group.

21. The apparatus of claim 20, further comprising:
means for establishing and maintaining the group session with the first group over the Wi-Fi peer-to-peer connections; and
means for establishing a control messaging scheme for broadcasting the first group session ID, the first transport port information, and a set of streaming parameters to unconnected sink devices for allowing them to be associated with the first group session ID.

22. The apparatus of claim 20, further comprising
means for adding or removing one or more of the Wi-Fi peer-to-peer connected sink devices from the associated group session ID based on one of a request initiated at the source device or a request initiated at the sink device; and means for adding or removing one or more of the Wi-Fi peer-to-peer connected sink devices from the associated group session ID based on an insufficient capability of the sink device, wherein the insufficient capability of the sink device includes at least its inability to support a session type or an inability to support at least one of the streaming parameters to be used for content streaming.

23. The apparatus of claim 20, wherein at least one of the particular multimedia content, the group session ID, a session type, the transport port information, and the set of streaming parameters is different for the first and second groups of devices.

24. The apparatus of claim 20, wherein establishing the Wi-Fi peer-to-peer connection includes an exchange of a Wi-Fi Display device discovery information, wherein the Wi-Fi Display device discovery information comprises at least an indication of a group session capability of the apparatus, a set of group session management control port data, a group session type, and a set of streaming parameters to be used for content streaming.

25. The apparatus of claim 24, wherein at least a subset of the Wi-Fi Display device discovery information is further exchanged through an Application Service Platform of the Wi-Fi Direct Services standard over a pre-established Wi-Fi peer-to-peer connection.

26. A non-transitory computer-readable medium comprising code that, when executed, causes an apparatus configured as a source device to transmit multimedia content to a plurality of sink devices and:

connect the source device to the plurality of sink devices by making a first Wi-Fi peer-to-peer connection with a first sink device in a first group and a second Wi-Fi peer-to-peer connection with a second sink device in a second group;

generate a first control message including a first group session ID and a first transport port number at the source device, the first transport port number to be used for communicating to the first group a particular multimedia content associated with the group, the first group session ID being used by the source for autonomously initiating a group session with the first group;

generate a second control message including a second group session ID and a second transport port number at the source device, the second transport port number to be used for communicating to the second group a particular multimedia content associated with the second group, the second group session ID being used by the source for autonomously initiating a group session with the second group;

determine a set of streaming parameters for the Wi-Fi peer-to-peer connected sink devices associated with the first group session ID based on capabilities of the first group; and determine a set of streaming parameters for the Wi-Fi peer-to-peer connected sink devices associated with the second group session ID based on capabilities of the second group;

transmit to each of the Wi-Fi peer-to-peer connected sink devices in the first group the first control message;

transmit to each of the Wi-Fi peer-to-peer connected sink devices in the second group the second control message;

transmit, using the first transport port number and according to the set of streaming parameters associated with the first group, the particular multimedia content to the Wi-Fi peer-to-peer connected sink devices of the first group; and transmit, using the second transport port number and according to the set of streaming parameters associated with the second group, the particular multimedia content to the Wi-Fi peer-to-peer connected sink devices of the second group.

27. The medium of claim 26, further comprising code that, when executed, causes an apparatus to add or remove one or more of the Wi-Fi peer-to-peer connected sink devices from the associated group session ID based on one of a request initiated at the source device or a request initiated at the sink device; and add or remove one or more of the Wi-Fi peer-to-peer connected sink devices from the associated group session ID based on an insufficient capability of the sink device, wherein the insufficient capability of the sink device includes at least its inability to support a session type or an inability to support at least one of the streaming parameters to be used for content streaming.

28. The medium of claim 26, wherein establishing the Wi-Fi peer-to-peer connection includes an exchange of a Wi-Fi Display device discovery information, wherein the Wi-Fi Display device discovery information comprises at least an indication of a group session capability of the source device, a set of group session management control port data, a group session type, and a set of streaming parameters to be used for content streaming.

29. The medium of claim 28, wherein at least a subset of the Wi-Fi Display device discovery information is further exchanged through an Application Service Platform of the Wi-Fi Direct Services standard over a pre-established Wi-Fi peer-to-peer connection.

* * * * *